(12) United States Patent
Buzby et al.

(10) Patent No.: US 9,004,563 B2
(45) Date of Patent: Apr. 14, 2015

(54) PICK UP DEVICE WITH TELESCOPING TUBE

(71) Applicant: PikStik, LLC, Hobart, IN (US)

(72) Inventors: David Buzby, San Francisco, CA (US); John McKenney, Collierville, TN (US)

(73) Assignee: PikStik, LLC, Hobart, IN (US)

( * ) Notice: Subject to any disclaimer, the term of this patent is extended or adjusted under 35 U.S.C. 154(b) by 0 days.

(21) Appl. No.: 13/952,446

(22) Filed: Jul. 26, 2013

(65) Prior Publication Data

US 2014/0183890 A1 Jul. 3, 2014

Related U.S. Application Data

(63) Continuation of application No. 12/386,055, filed on Apr. 11, 2009, now abandoned.

(60) Provisional application No. 61/123,930, filed on Apr. 11, 2008.

(51) Int. Cl.
*B66F 19/00* (2006.01)
*B25J 1/04* (2006.01)
*A47F 13/06* (2006.01)

(52) U.S. Cl.
CPC ... *B25J 1/04* (2013.01); *A47F 13/06* (2013.01)

(58) Field of Classification Search
CPC ...... B25B 9/00; B25J 1/04; E01H 2001/1293; E21B 31/18; A01B 1/18; A01D 46/247; A01D 46/24; A01D 51/002; A01D 51/00; A01D 46/005
USPC .......... 294/209, 210, 115; 56/333, 328.1, 332
See application file for complete search history.

(56) References Cited

U.S. PATENT DOCUMENTS

| 388,776 | A | 8/1888 | Hall |
|---|---|---|---|
| 826,160 | A | 7/1906 | Hall |
| 919,731 | A | 4/1909 | May |
| 944,214 | A | 12/1909 | Rydquist |
| 1,051,374 | A | 1/1913 | Agin |

(Continued)

FOREIGN PATENT DOCUMENTS

| DE | 3335728 A1 | 4/1985 |
|---|---|---|
| DE | 20017140 U1 | 12/2000 |

(Continued)

OTHER PUBLICATIONS

EP Search Report dated Nov. 3, 2009 from related EP Application No. 06801150.1.

(Continued)

*Primary Examiner* — Stephen Vu
(74) *Attorney, Agent, or Firm* — Quine Intellectual Property Law Group, P.C.

(57) ABSTRACT

An adjustable length device for grasping and manipulation of objects comprising a head region with opposing jaws joined to a handle region via a telescoping tube region. The tube region comprises a toothed rod connected to the jaws and a cable connected at one end to a trigger in the handle region and at the other end via a lever to a toothed rod locking mechanism (TRLM). The lever comprises one or more teeth that can mate with those of the toothed rod. Squeezing the trigger causes the lever in the TRLM to engage with the toothed rod and releasing the trigger causes the lever to disengage.

10 Claims, 24 Drawing Sheets

(56) References Cited

U.S. PATENT DOCUMENTS

| | | |
|---|---|---|
| 2,613,100 A | 10/1952 | Casey |
| 2,616,741 A | 11/1952 | Ziese |
| 3,219,376 A | 11/1965 | Peters |
| 3,346,293 A | 10/1967 | Wilcox |
| 3,576,343 A | 4/1971 | Juhlin et al. |
| 3,761,121 A | 9/1973 | Reid |
| 3,934,915 A | 1/1976 | Humpa |
| 4,037,868 A | 7/1977 | Baker |
| 4,039,216 A | 8/1977 | Soos |
| 4,374,600 A | 2/1983 | van Zelm |
| 4,398,759 A | 8/1983 | Manola |
| 4,613,179 A | 9/1986 | van Zelm |
| 4,629,234 A | 12/1986 | Sokolowski |
| 4,647,094 A | 3/1987 | Bergkvist et al. |
| 4,669,769 A | 6/1987 | Polder, Jr. |
| 4,711,482 A | 12/1987 | Brown et al. |
| 4,758,035 A | 7/1988 | Shimasaki |
| D298,728 S | 11/1988 | Bergkvist et al. |
| 4,863,204 A | 9/1989 | Peters |
| 4,962,957 A | 10/1990 | Traber |
| 5,154,465 A | 10/1992 | Pakosh |
| 5,380,054 A | 1/1995 | Galvis |
| 5,401,354 A | 3/1995 | Colucci |
| 5,577,785 A | 11/1996 | Traber et al. |
| 5,590,923 A | 1/1997 | Berger et al. |
| 5,857,723 A | 1/1999 | Mathieu et al. |
| 5,895,082 A | 4/1999 | Kaluzny |
| 6,257,634 B1 | 7/2001 | Wei |
| 6,457,761 B1 | 10/2002 | Benoit |
| 6,508,496 B1 | 1/2003 | Huang |
| 6,513,844 B1 | 2/2003 | Hsu |
| 6,520,556 B1 | 2/2003 | Hsu |
| 6,640,667 B1 | 11/2003 | Pomerantz |
| 6,669,254 B2 | 12/2003 | Thom et al. |
| 6,739,637 B2 | 5/2004 | Hsu |
| 6,848,731 B2 | 2/2005 | Khubani et al. |
| 6,874,833 B2 | 4/2005 | Keith et al. |
| 7,344,171 B1 | 3/2008 | McMullan |
| 7,665,782 B2 | 2/2010 | Buzby et al. |
| 2003/0020293 A1 | 1/2003 | Hsu |
| 2004/0154133 A1 | 8/2004 | Polzin et al. |
| 2005/0057055 A1 | 3/2005 | Deal |
| 2008/0224488 A1 | 9/2008 | Khubani |
| 2010/0021279 A1 | 1/2010 | Buzby et al. |

FOREIGN PATENT DOCUMENTS

| | | |
|---|---|---|
| FR | 1080718 | 12/1954 |
| JP | 2003-010195 A | 1/2003 |

OTHER PUBLICATIONS

International Report on Patentability dated Feb. 21, 2008 from related International Application No. PCT/US2006/031206.

International Report on Patentability dated Oct. 21, 2010 from related International Application No. PCT/US2009/002291.

International Search Report and Written Opinion dated Oct. 5, 2007 from related International Application No. PCT/US2006/031206.

EP Search Report dated Jun. 8, 2011 from corresponding EP Application No. 09729928.3.

International Search Report and Written Opinion dated Dec. 1, 2009 from corresponding International Application No. PCT/US2009/002291.

"Robot Claw Grabber" by Toysmith, from http://web.archive.org/web/20050227054600/http://www.toys2wish4.com/robclawgrab.html.

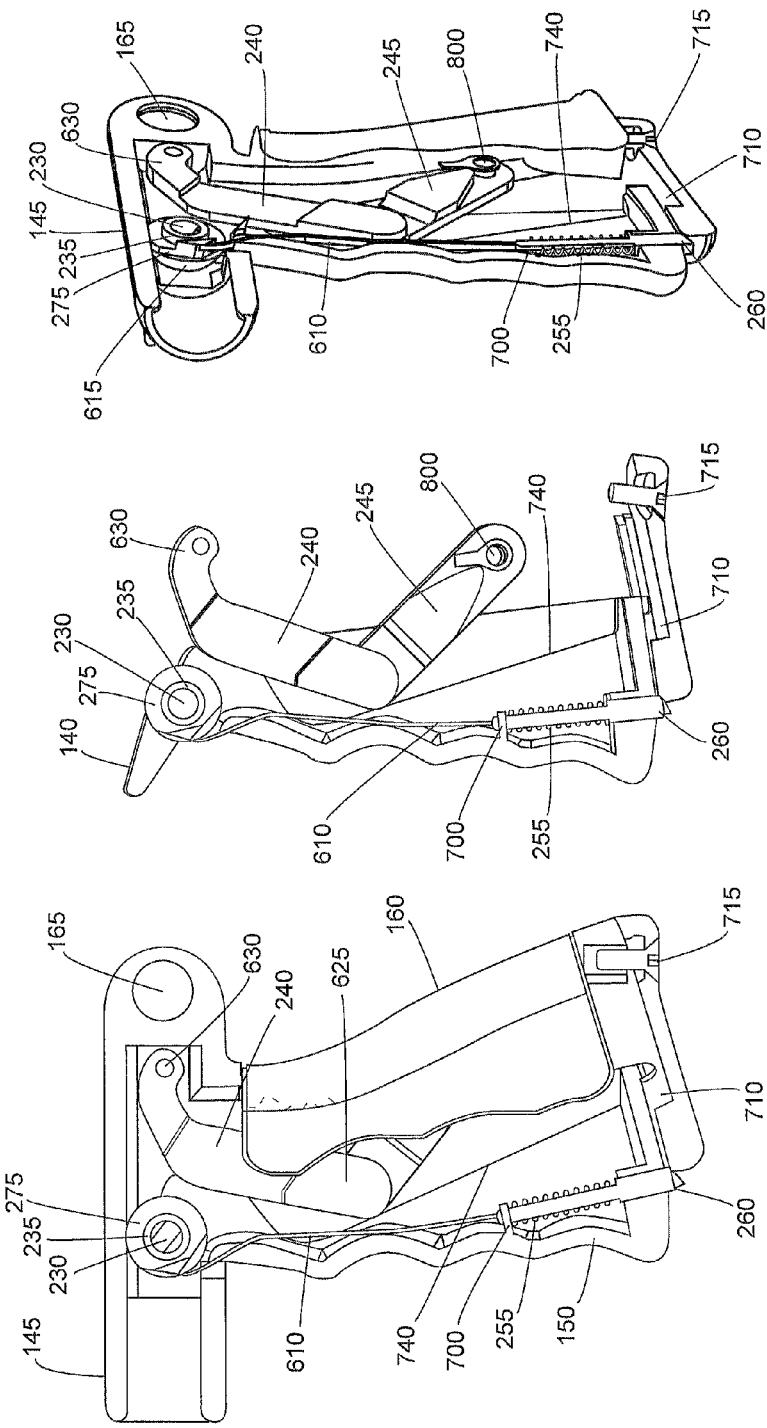

PICK UP DEVICE WITH TELESCOPING TUBE

CROSS-REFERENCE TO RELATED APPLICATIONS

This application is a continuation of U.S. application Ser. No. 12/386,055, filed Apr. 11, 2009, now abandoned, which claims priority to and benefit of U.S. provisional patent application Ser. No. 61/123,930, filed Apr. 11, 2008, the specifications of which are incorporated herein in their entirety.

FIELD OF THE INVENTION

The present invention relates to hand operated portable devices for grasping and manipulation of objects. More specifically, the invention comprises adjustable length devices for grasping and manipulation of objects, e.g., by persons with limited physical ability due to age, weakness, or the like, and/or for grasping and manipulation of objects out of normal/easy reach of persons.

BACKGROUND OF THE INVENTION

Many persons need the ability to grasp and manipulate objects that are normally out of their reach or that would otherwise be inconvenient or difficult to reach. For example, picking up objects on the ground or on high shelves can often be problematic. Such needs are even greater for persons having limited physical ability (e.g., due to age or infirmity). Such persons can have limited gripping ability or hand strength or can have limited bending or stretching ability, thus, leading to greater need for help in picking up or reaching objects.

While a number of devices have been developed to help in reaching/picking up objects, such prior work has been lacking in a number of areas. For example, such devices are of a fixed length which can limit their usability. Furthermore, such devices typically include a direct correspondence between the distance the trigger is moved by the user and the distance moved by the gripping portion of the device. Such correspondence, thus often requires a large hand movement to completely grasp small objects. Furthermore, such devices typically require constant pressure to keep the object grasped within the device. Various embodiments of the present invention address the above and other issues and provide novel adjustable length devices for grasping and/or manipulation of objects. The current invention also provides additional advantages which will be apparent upon reading of the description, claims, and figures herein.

SUMMARY OF THE INVENTION

In various aspects, the current invention comprises an adjustable length device for grasping and/or picking up objects.

In one group of embodiments herein, the invention comprises an adjustable length pick up device for grasping an object wherein the devices comprise a head region comprising two opposing jaw members, a tube region that is operably connected to the head region and, a handle region that is operably connected to the tube region and which comprises a trigger mechanism. In some such devices, the tube region comprises an adjustable length and squeezing the trigger causes the jaw members to move towards each other. Also, in some such embodiments, the tube region comprises a telescoping tube. Also, in some of such embodiments, the tube region comprises: a cable that is operably connected to the trigger; a toothed rod that has a plurality of teeth and that is operably connected to the jaw members; and a toothed rod locking mechanism (TRLM) that is operably connected to the cable, wherein squeezing the trigger causes the TRLM to operably engage with the toothed rod. Furthermore, in some of such embodiments, the head region comprises two opposing angled jaw members, each of which jaw members comprises a proximal end and a distal end, and each of which jaw members is operably attached at a pivot point to a jaw base assembly, thus allowing movement of each jaw member around its pivot point; wherein the proximal end of both jaw members operably interacts with a jaw actuator within the jaw base assembly, which jaw actuator is operably connected to an actuator rod and a jaw actuator spring and wherein the actuator rod is operably connected to the toothed rod; wherein the handle region comprises a handle body having a base, a trigger, and a linkage lever having a free end wherein the cable is operably coupled to the free end of the linkage lever; and, wherein squeezing the trigger causes the linkage lever to extend towards the base of the handle body, thus causing the cable to move proximally in the handle body and in the tube region and causing the TRLM to operably engage with the toothed rod which thereby causes the toothed rod to move proximally in the tube region, thus causing the jaw actuator rod and jaw actuator to move proximally, which in turn, draws in the proximal end of each jaw member, thus causing each jaw member to move around its pivot point and causing the distal ends of the opposing jaw members to move towards one another. Also, in some such embodiments, the TRLM comprises a lever (which can comprise one or more teeth which can mate with the teeth of the toothed rod), which lever is operably controlled by the trigger via the cable, wherein squeezing the trigger causes the lever of the TRLM to operably engage with the toothed rod and wherein releasing the trigger causes the lever to operably disengage with the toothed rod.

In another group of embodiments the device comprises a head region having two opposing jaw members with each member having a proximal end (i.e., an end closer to the handle end and closer to the user of the device when it is held by the handle) and a distal end (i.e., the end further from the handle), and each of which jaw members is operably attached at a pivot point to a jaw base assembly. Such attachment, thus, allows movement of each jaw member around its pivot point. In such embodiments, the proximal end of both jaw members operably interacts with a jaw actuator within the jaw base assembly (typically by inserting into the actuator). In turn, the jaw actuator is operably connected to an actuator rod and a jaw actuator spring (which helps in holding open the jaw members, e.g., when the trigger is not being squeezed or when it is optionally locked). Such embodiments also comprise an elongated hollow tube region made of two or more hollow tube subparts of differing diameter, one of which can be slid into the interior of the other (which allows for adjustment of the overall length of the hollow tube/shaft region) and which enclose a toothed rod, toothed rod locking mechanism, and cable that are operably connected to the actuator rod (via the toothed rod). Also, such embodiments comprise a handle region comprising a handle body, an optional latch mechanism (e.g., latching lever, latch cable, latch, latching spring, etc.), and a trigger grip with a linkage lever (i.e., a leverage action trigger) that has the cable operably coupled to its free bottom end. In such embodiments, by squeezing the trigger the linkage lever can be caused to extend downwards in the handle body towards the handle base, which pulls the cable, the toothed rod locking mechanism, and the toothed rod proximally in the handle body and in the tube region. The movement of the cable and toothed rod, etc., thus causes the jaw actuator rod and jaw actuator to also move proximally, which in turn, draws in the proximal end of each jaw member and causes each jaw member to move around its pivot point so that the distal ends of the opposing jaw members move towards one another.

In the various embodiments herein, the jaw actuator spring can exert pressure against the proximal end of the jaw actuator thus causing the distal ends of the jaw members to pivot away from each other as the jaw actuator is pushed distally. Such pressure helps in keeping the jaw members open (extended away from each other) when the trigger/linkage lever is not squeezed and/or locked.

In some of the various embodiments herein, the devices comprise an optional latch mechanism which comprises a spring loaded latch that is operably attached to a latch cable, which, in turn, is operably coupled to a latching lever. The latch mechanism, when set (or engaged), reversibly locks the trigger/linkage lever, thereby reversibly locking the jaw members at a desired position. Additionally, in some such devices having the optional latch mechanism, expansion of the components within the device such as the toothed strap and/or cable, etc., (e.g., when pressure is applied on it from the trigger/linkage lever via the cable) allows the trigger to be squeezed further in, even when the jaw members cannot move closer together (e.g., when an object is being grasped by the device). Such expansion thus allows the optional trigger to move far enough into the handle body so that if the latching lever is set, the spring loaded latch will engage and prevent the jaw members from opening.

In the various embodiments, the devices of the invention can have jaw members that comprise a textured inner surface layer and/or which comprise a pad area at their proximal tips.

In some of the various devices herein, movement of the trigger can cause a movement of the jaw members over a greater distance than that moved by the trigger (assuming that the jaws are allowed to freely move and are not blocked, etc.).

Also, in some of the various devices herein the handle body can comprise a palm rest area that comprises a thermoplastic rubber and/or thermoplastic elastomer overlay on the handle body. Such rest area is located so as to improve user comfort and performance by, e.g., reducing slipping, adding in durability and increasing aesthetics.

In certain of the various embodiments, the head region of the device can be rotated in relation to the tube region and handle region, and secured in one or more orientations, e.g., by the interaction of fluted or grooved areas within the tube region and raised protuberances on the inner lumen of the proximal opening of the jaw base assembly.

In other aspects, the invention comprises a method of grasping and/or picking up an object by first situating two opposing angled jaw members of the head region of an adjustable length pick up device around the object, wherein the device also comprises a tube region operably connected to the head region and a handle region operably connect to the tube region, which handle region comprises a trigger mechanism and then squeezing the trigger which causes the jaw members to move towards each other and thus grasp and/or pick up the object. In some such embodiments, the tube region can comprise a telescoping tube. Also, in some such methods the tube region can comprises: a cable that is operably connected to the trigger; a toothed rod comprising a plurality of teeth which toothed rod is operably connected to the jaw members; and a toothed rod locking mechanism (TRLM) that is operably connected to the cable wherein squeezing the trigger causes the TRLM to operably engage with the toothed rod which causes the jaw members to move towards each other and thus grasp and/or pick up the object. Furthermore, in some such embodiments, the head region can comprises two opposing angled jaw members, each of which jaw members comprises a proximal end and a distal end, and each of which jaw members is operably attached at a pivot point to a jaw base assembly, thus allowing movement of each jaw member around its pivot point; wherein the proximal end of both jaw members operably interacts with a jaw actuator within the jaw base assembly, which jaw actuator is operably connected to an actuator rod and a jaw actuator spring and wherein the actuator rod is operably connected to the toothed rod wherein the handle region comprises a handle body having a base, a trigger, and a linkage lever having a free end wherein the cable is operably coupled to the free end of the linkage lever; and, wherein squeezing the trigger causes the linkage lever to extend towards the base of the handle body, thus causing the cable to move proximally in the handle body and in the tube region and causing the toothed rod locking mechanism to operably engage with the toothed rod which thereby causes the toothed rod to move proximally in the tube region, thus causing the jaw actuator rod and jaw actuator to move proximally, which in turn, draws in the proximal end of each jaw member, thus causing each jaw member to move around its pivot point and causing the distal ends of the opposing jaw members to move towards one another and thus grasp and/or pick up the object. In some such embodiments, the TRLM comprises a lever (which can comprise one or more teeth that are capable of mating with the teeth of the toothed rod), which lever is operably controlled by the trigger via the cable, wherein squeezing the trigger causes the lever of the TRLM to operably engage with the toothed rod and wherein releasing the trigger causes the lever to operably disengage with the toothed rod.

In other aspects the invention comprises methods of grasping and/or picking up an object with an adjustable length pick-up device. Embodiments of such methods comprise selecting an appropriate length at which to set the tube/shaft region of the device (and setting it at such), situating two opposing angled jaw members of the device around the object, each of which jaw members comprises a proximal end and a distal end, and each of which jaw members is operably attached at a pivot point to a jaw base assembly (which allows movement of each jaw member around its pivot point). In such methods, the proximal end of both jaw members operably interacts with a jaw actuator (within the jaw base assembly) that is operably connected to an actuator rod. The device used in such method embodiments also comprises an adjustable length elongated hollow tube region, enclosing a toothed rod, a toothed rod locking mechanism, and a cable that are operably connected to the actuator rod. Additionally, the devices in such method embodiments also comprise a handle region comprising a handle body, an optional latch mechanism, and a trigger grip having a linkage lever, wherein the cable is operably coupled to the bottom of the linkage lever. In various embodiments, after the object is situated, the trigger is squeezed causing the linkage lever to extend downwards in the handle body. Such extension causes the cable and toothed rod/toothed rod locking mechanism to move proximally and causes the jaw actuator rod and jaw actuator to move proximally. The movement of the jaw actuator, in turn, draws in the proximal end of each jaw member which causes each jaw member to move around its pivot point and causes the distal ends of the opposing jaw members to move towards one another and thus grasp and/or pick up the object.

In yet other aspects, the invention comprises methods of grasping and/or picking up an object by situating two opposing jaw members of an adjustable length device around the object (which members are operably attached at pivot points to a base assembly and to a jaw actuator) and squeezing a trigger of the device (which trigger moves a linkage lever and which linkage lever is operably coupled, directly or indirectly, to the opposing jaw members), thereby moving the jaw members towards one another and grasping the object.

In another group of embodiments herein, the invention comprises an adjustable length device to operably connect at least two components. Such devices comprise: a cable having a first end and a second end, a rod having a first end and a second end, and a locking mechanism operably attached to the cable, wherein the locking mechanism comprises a movable lever, which lever is controllably engaged or disengaged by movement of the cable. In such devices, the locking mechanism can be moved along the rod when the lever is disengaged and is stationary when the lever is engaged. Also, such devices can comprise a tube that is adjustable in length and the rod can comprise a toothed rod and the lever can comprise one or more teeth that are capable of mating with the teeth of the toothed rod. In such embodiments, the cable can connect to a trigger mechanism wherein squeezing the trigger mechanism engages the lever with the toothed rod (that can be operably connected to one or more additional components such as a pair of opposable jaw members).

These and other devices and methods of the invention will become more fully apparent when the following detailed description is read in conjunction with the accompanying figures and claims.

BRIEF DESCRIPTION OF THE DRAWINGS

FIG. 2.

FIGS. 24A, 24B, and 24C display three views of various components of the handle region of an example embodiment of the invention (having a jaw locking/latching mechanism).

DETAILED DESCRIPTION

Before describing the present invention in detail, it is to be understood that this invention is not limited to particular embodiments, which can, of course, vary. It is also to be understood that the terminology used herein is for the purpose of describing particular embodiments only, and is not necessarily intended to be limiting. As used in this specification and the appended claims, terms in the singular and the singular forms "a," "an," and "the" include plural referents unless the context clearly dictates otherwise. Thus, for example, reference to "a pick up device" also includes a plurality of pick up devices, "a tooth" also includes a plurality of teeth, and the like.

Figure 1:
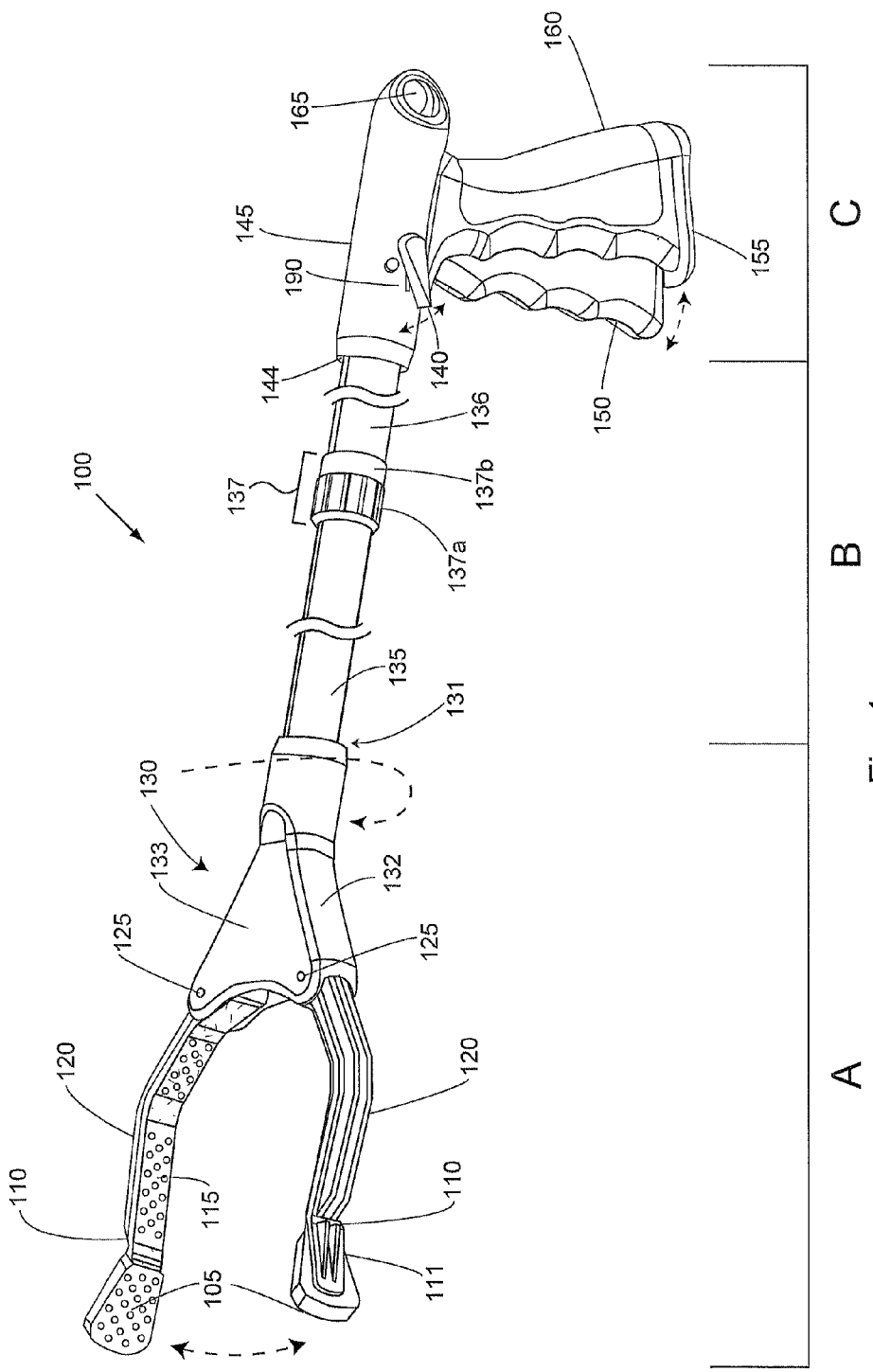
FIG. 1 displays a perspective view of an example embodiment of an adjustable length pick up device having a jaw locking mechanism and having the jaws of the device orientated horizontally.

Various exemplary embodiments of the present invention are illustrated in the accompanying figures. General perspective views of adjustable length pick up devices are shown in FIGS. 1 (with a latching mechanism to hold the jaws in place) and 2 (without a latching mechanism to hold the jaws in place). For purposes of description and illustration, the various adjustable length pick up devices of the invention, e.g., pick up device 100 in FIG. 1 or in FIG. 2, can roughly be considered in three sections. Thus, the device comprises a head region comprising two opposing jaws, Region A; an adjustable length tube (or shaft) region, Region B, comprising an extendable/adjustable elongated tube(s) or hollow structure(s); and a handle region, Region C, comprising a handle, a trigger, and an optional jaw locking (or latching) mechanism.

Figure 20:
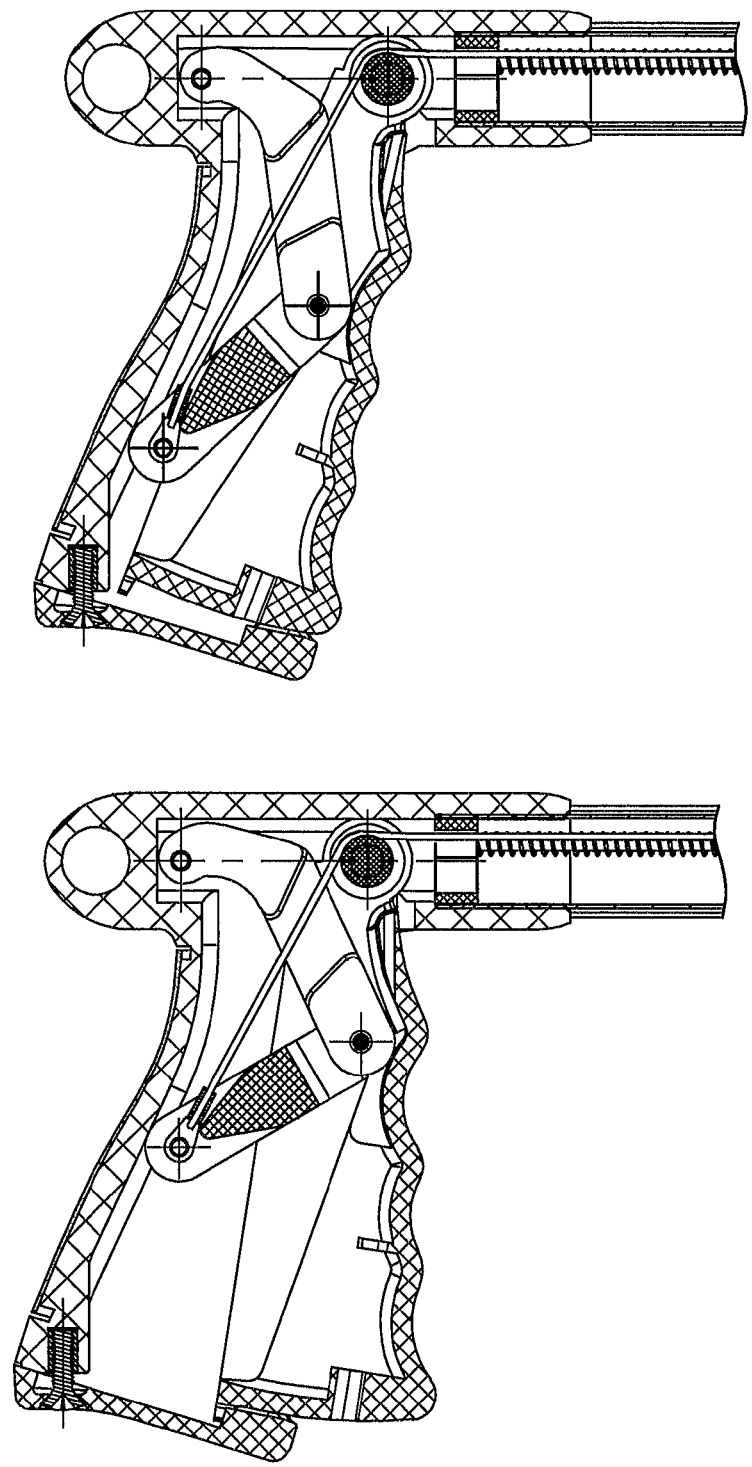
FIG. 20 displays two cut-away views of an example handle region of an embodiment of the invention (not having a locking/latching mechanism) showing movement of components within the handle during use.

While the elements in each section are generally discussed separately herein, it will be appreciated that such description should not be taken as limiting upon either the devices or uses/operation of the invention or upon the interaction or connectivity of the elements of the invention. Thus, it will be appreciated that various aspects of the embodiments shown in particular Figures (e.g., the linkage lever components in FIG. 20 or 24) can be applicable to the various embodiments of the telescoping pick up devices even though the components of FIG. 20 or 24 are not shown in every figure, etc.

Telescoping Tube Region

One of the benefits of the embodiments of the current invention is that the overall length of the devices can be adjusted by changing the length of the telescoping tube region. See Region B in FIG. 1. Because of the adjustable lengths, the embodiments of the invention can be used in a wider array of settings, e.g., they can be used to more conveniently grasp items over a wider range of distances.

It will be appreciated that the various embodiments of the invention can optionally comprise different components in order to allow adjustment in length of the device and that recitation of particular components/configurations, etc., should not necessarily be taken as limiting. Thus, for example, some embodiments can comprise a toothed rod locking mechanism (TRLM) lever with one tooth, while other embodiments can comprise a lever with two teeth, etc. See below.

It will also be appreciated that the telescoping mechanism (e.g., the telescoping tubes/shafts and their internal components, etc.) of the pick up devices herein can optionally be used with other non-pick up devices or with other types of pick up devices than those described herein. Thus, the telescoping components of the devices herein can also be applicable to telescoping devices used to, e.g., cut or trim items (as in pruning shears), to move an item (as in a paintbrush, etc.) or the like.

Figure 2:
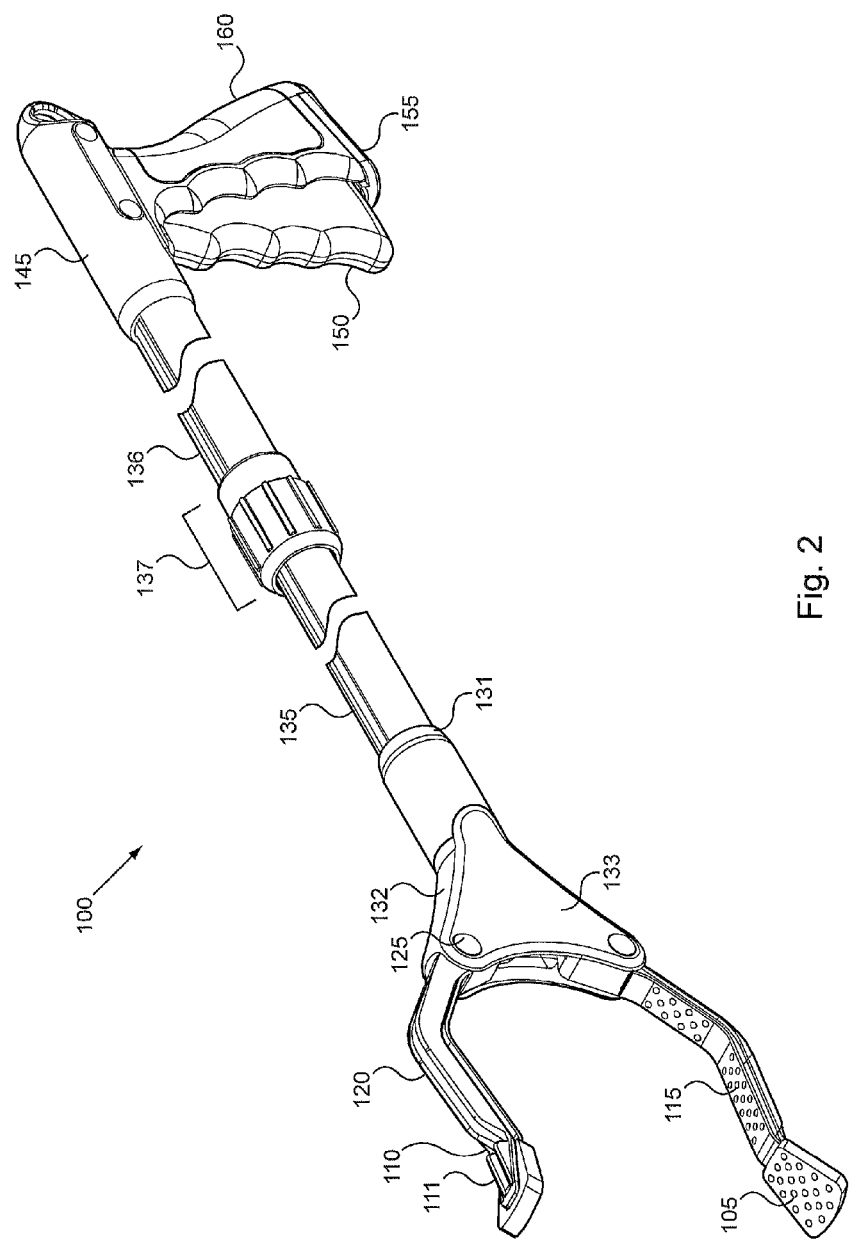
FIG. 2 displays a perspective view of an example embodiment of an adjustable length pick up device which does not have a jaw locking mechanism and with the jaws of the device orientated vertically.
Figure 12:
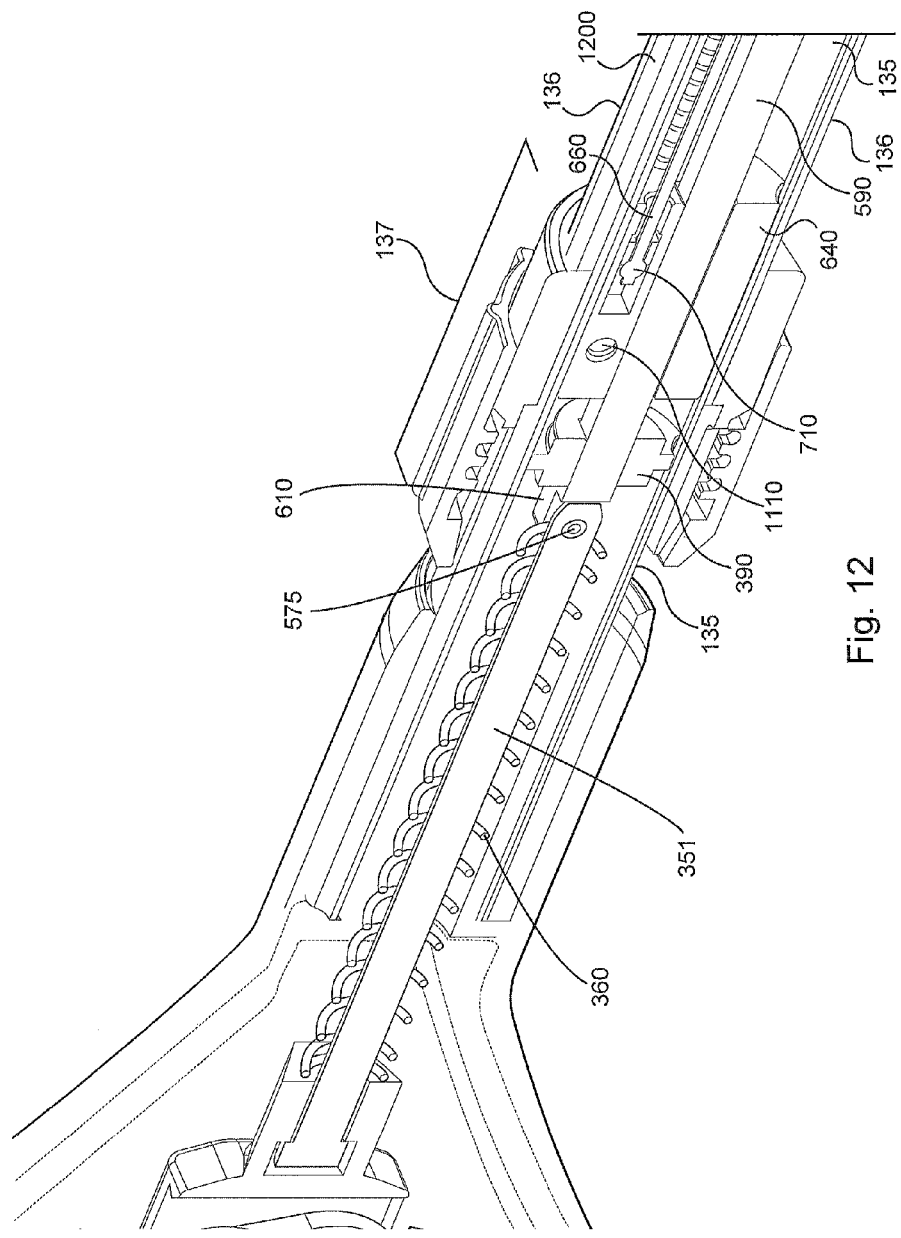
FIG. 12 displays a cut-away view of example interior components of a portion of the telescoping tube region of an embodiment of the invention.
Figure 13:
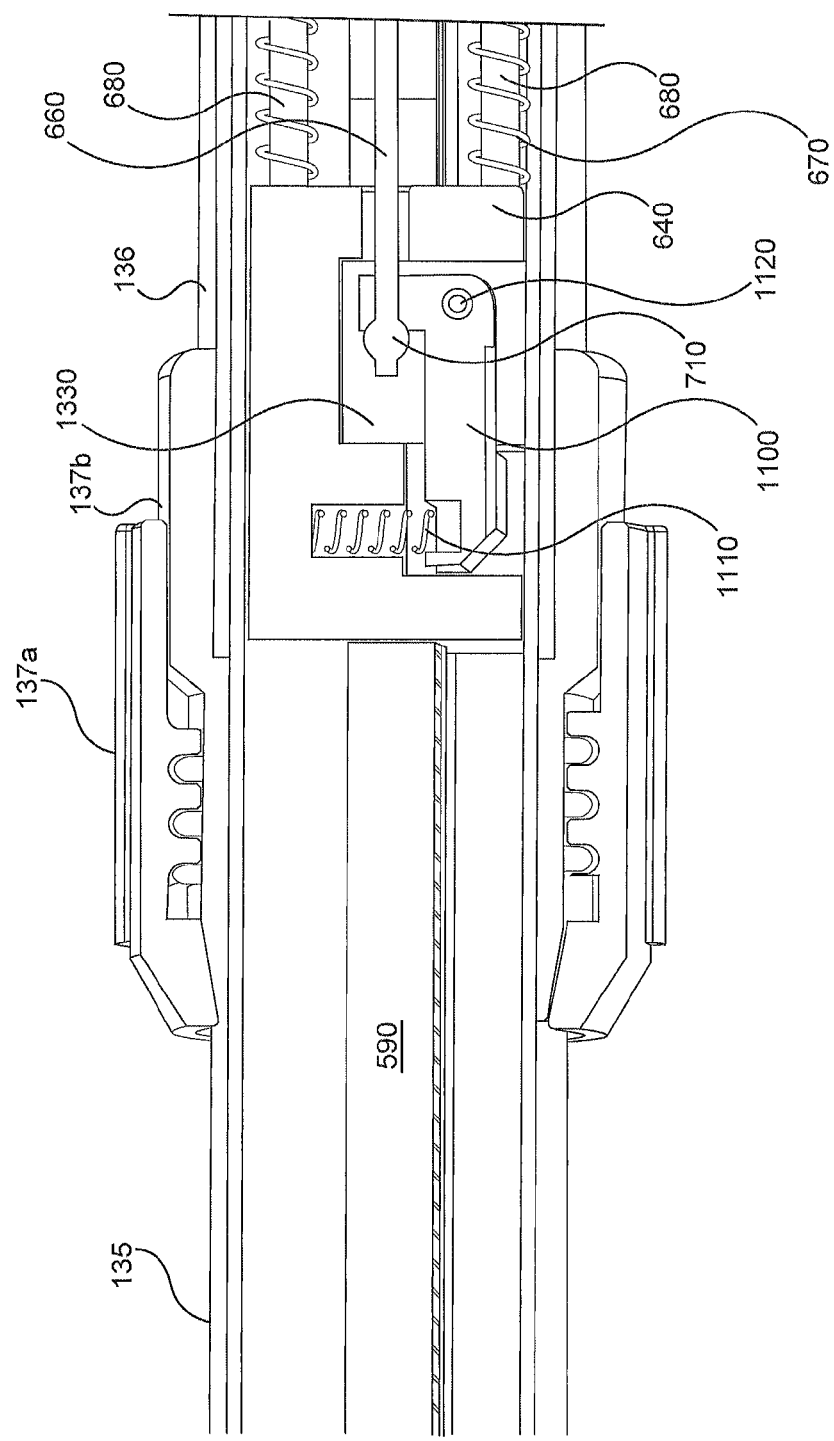
FIG. 13 displays a cut-away view of example interior components of the telescoping tube region of an embodiment of the invention.

As can be seen in FIGS. 1 and 2 in adjustable length pick up devices of the invention, interacting hollow tubes 135 and 136 connect the head region of the device with the handle region of the device. The hollow tubes comprise at least two subparts (e.g., distal tube 135 and proximal tube 136 as shown in FIGS. 1 and 2). Of course, it will be appreciated that other embodiments of the invention can comprise a greater number of tube subparts, e.g., 3, 4, 5, 10, 20, or more. In general, components of the devices herein are described as distal or proximal depending upon their spatial relation with the handle of the device, with "distal" components being further from the handle and "proximal" components being closer to the handle. In particular embodiments, one subpart of the telescoping tube or shaft region is of smaller overall diameter than the lumen opening of the other subpart, thus allowing the smaller subpart to slide into the wider subpart (e.g., the distal tube can slide into the interior of the proximal tube). See, e.g., FIGS. 8, 12, and 13. It will be appreciated that while in the present description the distal tube is shown as a smaller diameter than the proximal tube (and thus capable of sliding within the proximal tube), in some embodiments, the reverse is true.

In other words, in some embodiments, the proximal tube is of smaller diameter, and can slide into, the distal tube. Because the smaller diameter tube can be inserted into the larger tube, the overall length of the hollow tube can thus be adjusted.

In various embodiments, the ends of the telescoping tubes mate with the proximal end of the jaw base assembly (meeting point 131) and with the distal end of the handle (meeting point 144). In certain embodiments, the ends of the tubes are inserted within the jaw base assembly and the handle. The ends of the jaw base assembly and the handle can have specific diameters at such mating points so that the tubes fit snugly therein. See, e.g., FIGS. 5, 7, 19, 20, 23, etc. The telescoping tube can be held in place with the jaw base assembly and with the handle by friction, by glue or adhesive, by spot welds, by crimping, by screws, bolts, clamps, or the like, or by any combination thereof. The subparts of the telescoping tubes can be of different lengths and diameters in different embodiments, thus, allowing different embodiments to have different possible overall adjustable lengths possible.

In particular telescoping embodiments, one or more of the interlocking tubes can comprise fluting, or grooves, on their shafts (e.g., groove 1200). See below and FIGS. 2, 3, 8, 12, 17, etc. In such embodiments, the tubes can comprise, e.g., two grooves opposite each other on either side of the tube. The flutes in the tubes can, e.g., add structural integrity and/or strength to the telescoping tube and/or aid in stability and orientation of the telescoping pieces. For example, in some embodiments, the flutes of the distal tube can mate with flutes of the proximal tube. In some embodiments, only one part of the telescoping tube comprises fluting, e.g., in some embodiments, only the distal tube comprises fluting while the proximal tube does not or in some embodiments, only the tube that slides inside the other tube has flutes. As seen in the figures, various components within the tube/shaft, e.g., the toothed rod locking mechanism (TRLM), the distal plate, the floating plate, the proximal plate, etc., can also be fluted to match the fluting of the tube/shaft. See, e.g., FIGS. 6, 8, 9, 18, etc. The fluting can also help guide such internal mechanisms (e.g., those for the telescoping aspect and/or those for movement of the jaws). Such fluting also can add decorative interest and can in certain embodiments, aid in rotation of the head region around the shaft. See below.

In various embodiments, the telescoping tubes are constructed from or comprise, e.g., metal (e.g., aluminum, anodized aluminum, steel, stainless steel, iron, magnesium, magnesium alloy, or various metallic alloys), plastic (e.g., a polycarbonate, a polyvinyl, a thermoplastic, a thermoplastic elastomer, a thermoplastic rubber, a polyoxymethylene, Lexan®, Delrin®, etc.), ceramic, polymer, resin, or any combinations thereof. In certain embodiments, the tubes comprise anodized aluminum, while in other certain embodiments, the tubes comprise polyoxymethylene, Lexan, and/or Delrin.

In the various embodiments herein, the action of the trigger from the handle region is operably connected to movement of the jaws of the device via a mechanism (e.g., within the telescoping tube region) that can controllably connect and disconnect the trigger and the jaws. For example, the mechanism can operably connect the trigger and the jaws when the trigger is squeezed and disconnect the trigger/jaws when the trigger is not squeezed. The action of such mechanism is independent of the overall length of the telescoping tube region. It will be appreciated that while particular components and configurations of various embodiments of the mechanism for the operable connection between the trigger action and the jaw movement are depicted herein, such recitations should not necessarily be taken as limiting. Thus, in particular embodiments herein, the mechanism that operably connects/disconnects the trigger and the jaws of the device comprises a toothed rod locking mechanism (TRLM). Thus in some embodiments, a TRLM can operably connect/disconnect a cable (which in turn is operably attached to the trigger via the linkage lever) and a toothed rod (which in turn is operably connected to the jaws via the actuator rod).

Figure 5:
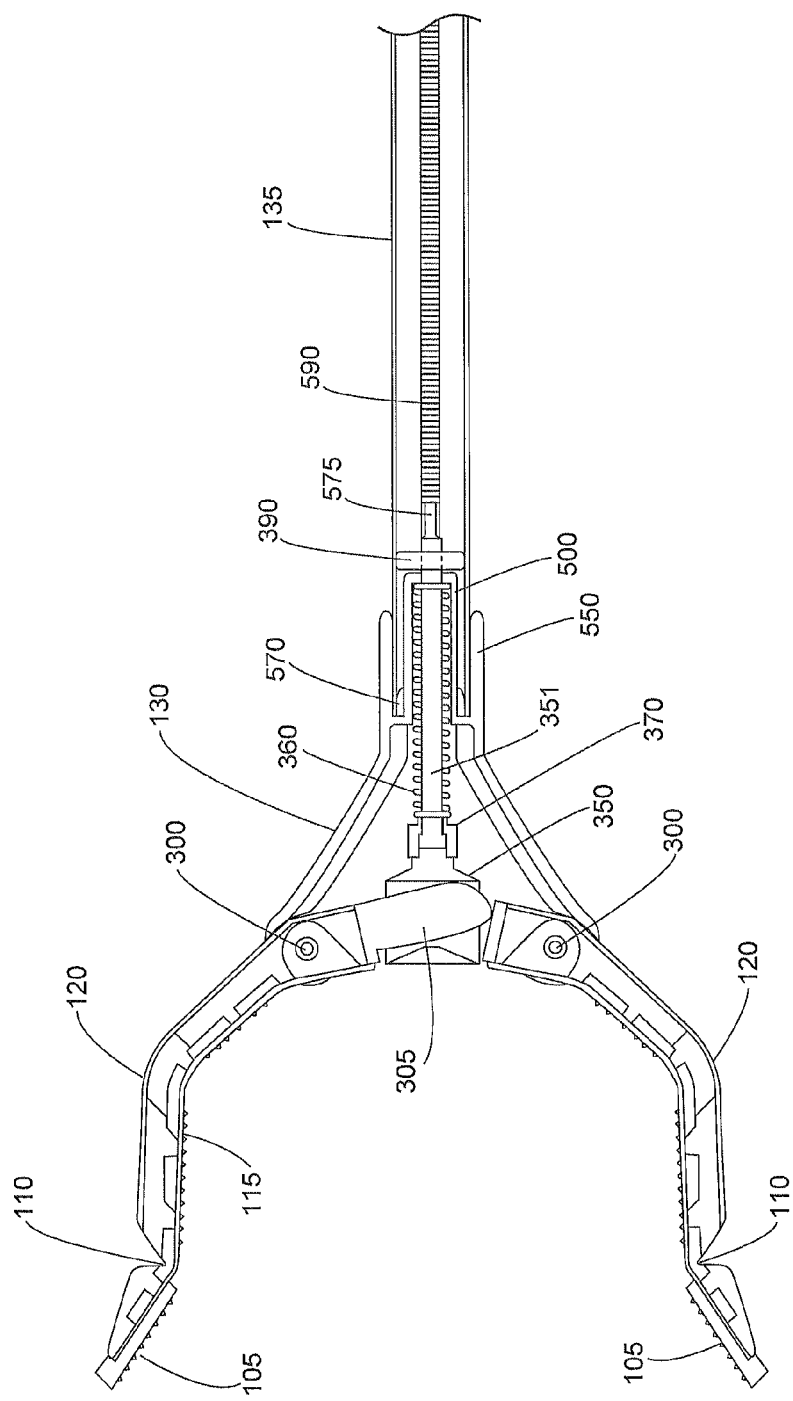
FIG. 5 displays a cut-away view of the head region and a portion of the distal part of the telescoping tube region of an example embodiment of the invention.
Figure 6:
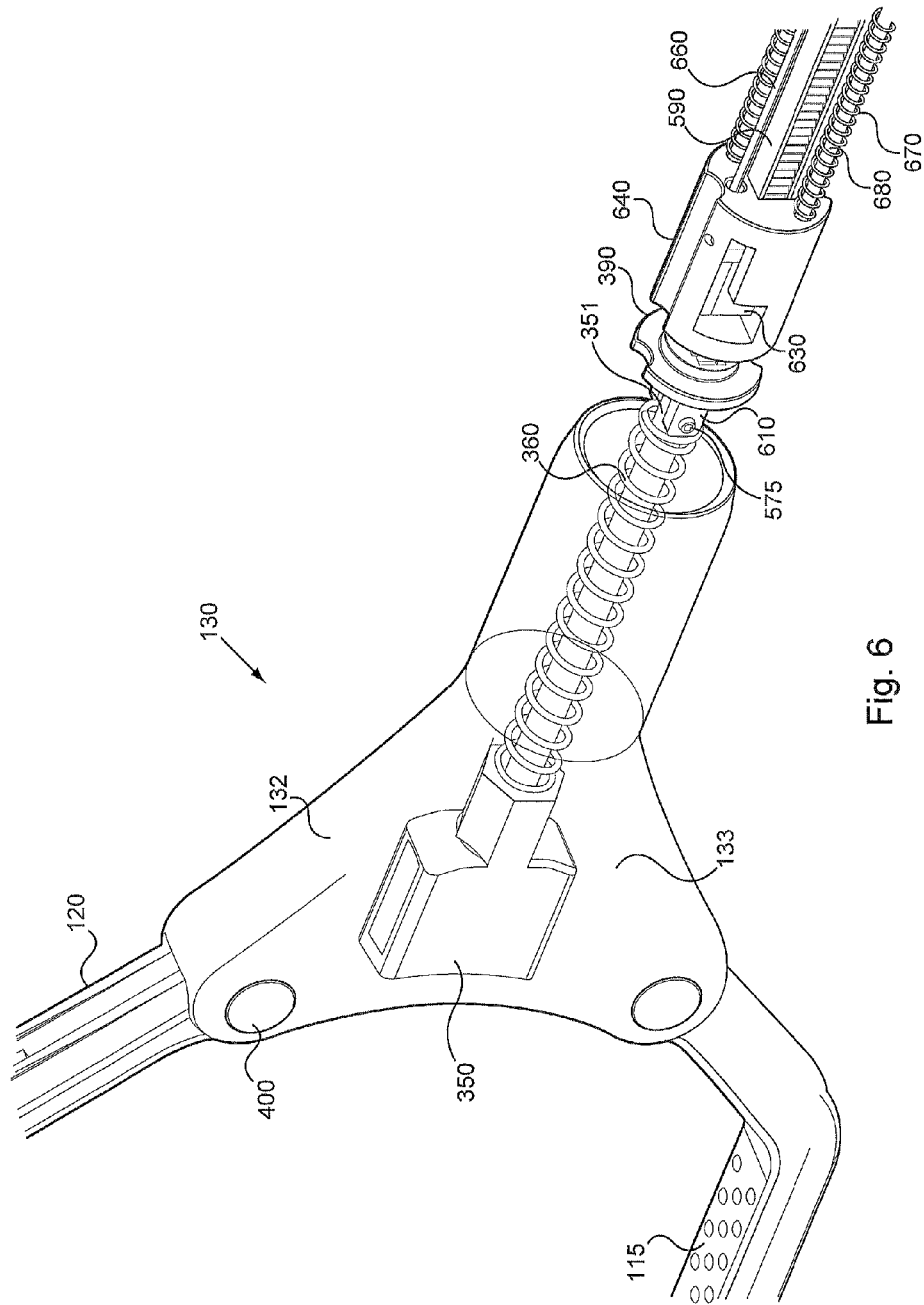
FIG. 6 displays various components of the head region and a portion of the telescoping tube region of an example embodiment of the invention.

In particular embodiments, a toothed rod, e.g., toothed rod 590 in FIG. 5, connects the actuator rod (e.g., rod 351 in FIG. 3) with a cable, e.g., cable 660 or similar, via a toothed rod locking mechanism (or toothed rod gripping mechanism), e.g., toothed rod locking mechanism (TRLM) 640. Thus, in such embodiments, the mechanism that operably connects the trigger action and the jaw movement comprises a TRLM (e.g., TRLM 640). Such interaction between the toothed rod, the TRLM, and the cable allows a user of the device to close the device's jaws by pulling the trigger. However, because such interaction is released when the trigger is released (assuming that the jaws are not locked with an optional jaw latching mechanism), the length of the hollow tube or shaft can also be adjusted. See below.

In certain embodiments, at its distal end, the toothed rod attaches to the actuator rod in the jaw base assembly. See, e.g., FIGS. 5 and 6. It will be appreciated that the interaction of the actuator rod and the toothed rod can occur within the jaw base assembly or within the telescoping tube region, depending on the embodiment. The toothed rod can attach to the actuator rod in a number of ways. For example, the toothed rod can bifurcate around the proximal end of the actuator rod (forming bifurcation area 610) and be connected via pin 876 or other similar connection at pin location 575. At its proximal end, the toothed rod is typically unattached and can freely move distally and proximally in the tube region. See, e.g., FIGS. 8, 19, etc. In some embodiments, the proximal end of the toothed rod is flanged (see FIG. 19), e.g., to help prevent the toothed rod from being pulled too far out (distally). The flanges can prevent the toothed rod from being pulled all the way through the TRLM. In other embodiments, the proximal end of the toothed rod can comprise a pin (such as pin 811) which is wider than the width of the end of the toothed rod and which is also wider than the opening in the TRLM (e.g., opening 1620) through which the toothed rod traverses, thus also preventing the toothed rod from being pulled too far out. In between its two ends, the toothed rod traverses the toothed rod locking mechanism (TRLM). As will be appreciated, the location of the TRLM on the toothed rod can vary as the length of the telescoping tube is adjusted. Thus, when one telescoping tube is pushed inside the other one (i.e., to in order to decrease the overall length of the device), the TRLM interacts with the toothed rod at a point closer to the distal end of the toothed rod, while when the telescoping tube is extended, the TRLM interacts with the toothed rod at a point closer to the proximal end of the toothed rod.

Figure 14:
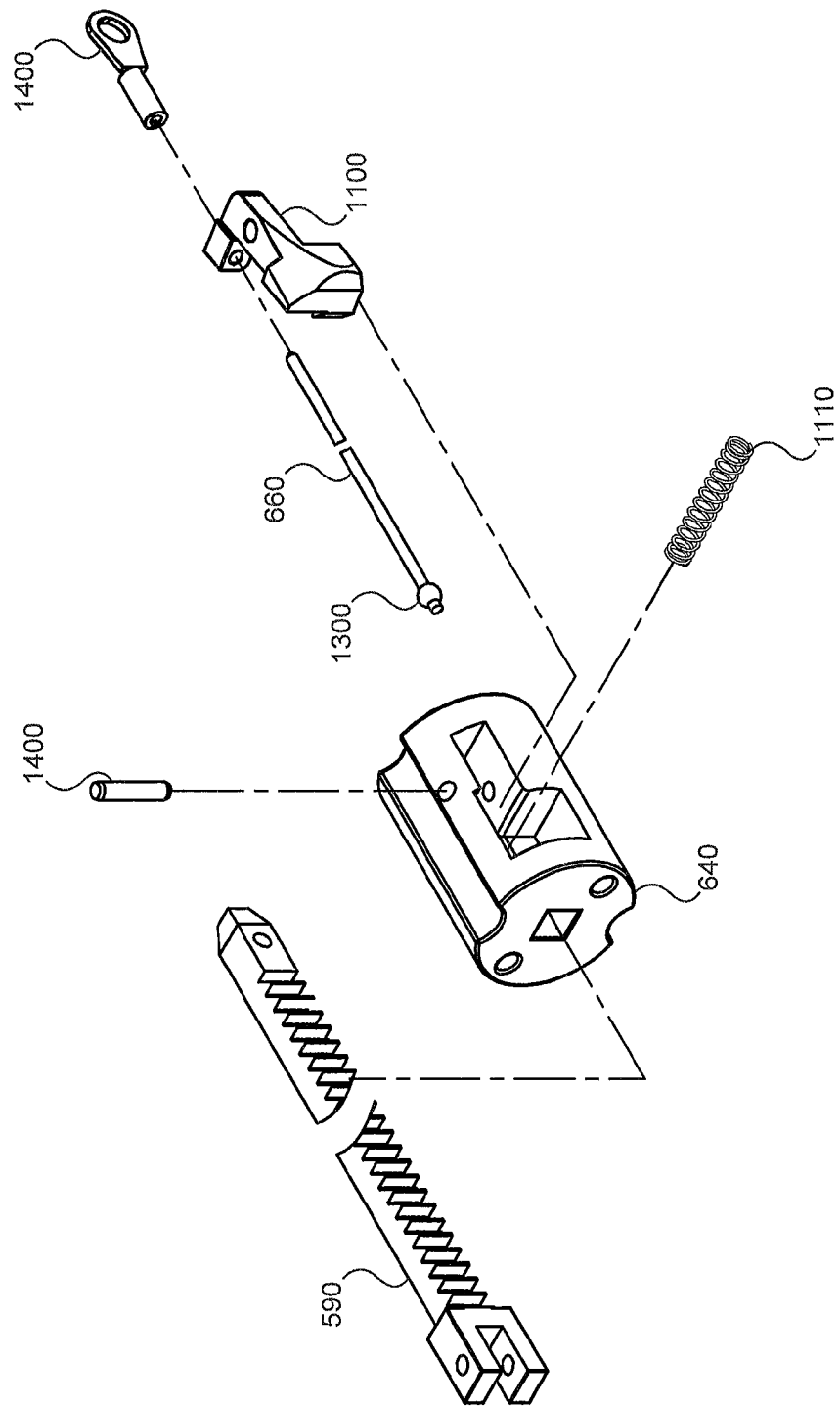
FIG. 14 displays an exploded view of example interior components of a portion of the telescoping tube region of an embodiment of the invention.

As can be seen in FIGS. 5, 6, 9, 14, etc., the toothed rod can optionally have teeth or similar crenellations in order to interact with the TRLM. As explained in more detail below, the toothed rod and the TRLM can interact via a TRLM lever. In the various embodiments having teeth or ridges/crenellations on the toothed rod, such teeth can be of different depth (i.e., one embodiment can have teeth that have a greater distance from their tips to their troughs than another embodiment), can be of different shape (e.g., teeth can be wide and shallow, teeth can be steep and thin, etc.). Furthermore, in some embodiments, the toothed rod can comprise outer sidewalls. See, e.g., FIG. 6. However, as shown in FIG. 14, the teeth or crenellations of the toothed rod can also be "open" or not bounded by sidewalls. Also, while the toothed rod is typically described herein as comprising teeth, in yet other embodiments, the rod can comprise a ladder conformation or the like. In such ladder embodiments, the rod does not comprise teeth, but rather has shaped openings (e.g., ladder-like) that can mate with one or more tooth or other protuberances from the lever in the TRLM. Also, while primarily shown in the accompanying figures as square, it will be appreciated that in various embodiments, the toothed rod can have a square, rectangular, triangular, round, oval, or other shaped cross-sectional profile. Furthermore, in various embodiments, the toothed rod can comprise teeth on more than one surface, e.g., on opposing surfaces of a square rod, on all surfaces of a square rod, on all surfaces of a triangular rod, as encircling ridges on a round or oval rod, etc. The teeth on the toothed rod can also be of any orientation, e.g., the teeth can be slanted towards the jaws or towards the handle of the device, or the teeth can be symmetrical (not slanted). Of course, in typical embodiments, the teeth of the toothed rod are designed to mate with teeth on the TRLM lever and are typically oriented to "grab" onto and "hold" the teeth on the TRLM lever when the lever is engaged (e.g., when the trigger of the device is activated). See below.

Figure 7:
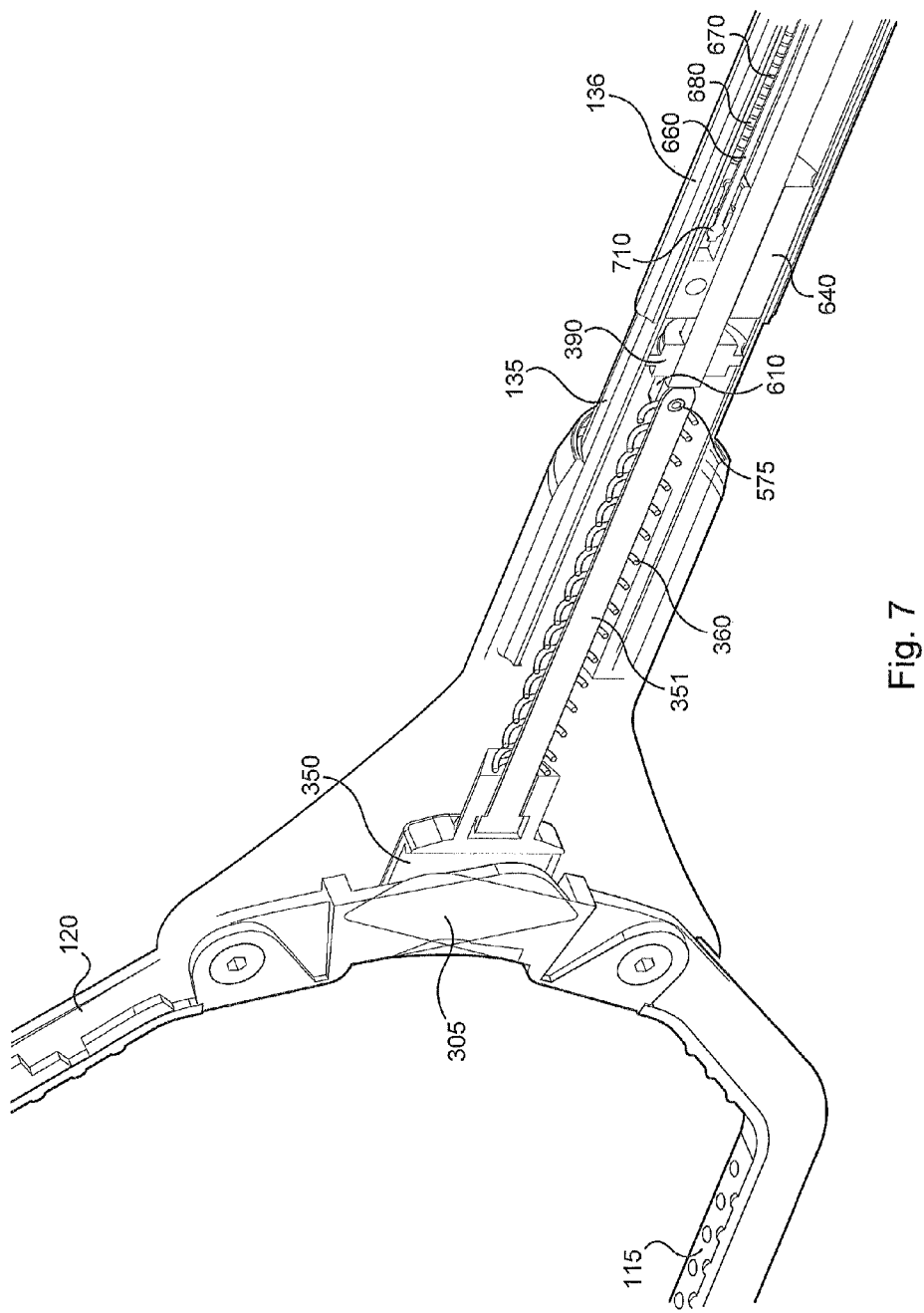
FIG. 7 displays a cut-away view of the head region and a portion of the telescoping tube region of an example embodiment of the invention.

The toothed rod fits into an opening in the TRLM (e.g., opening, 1620) and traverses through the TRLM as can be seen in, e.g., FIGS. 7, 16, etc. In typical operation of the devices of the invention, the toothed rod can be controllably moved through such opening, e.g., when the telescoping tube is expanded or contracted.

The TRLM is held in place in the telescoping shaft by placement or stabilizer rods, such as stabilizer rods 680. Such stabilizer rods keep the TRLM in proper placement and orientation without it having to be connected to the inside wall of the proximal or distal shaft. Because of this "free floating" aspect of the TRLM, the proximal end of the distal shaft can be inserted into the distal end of the proximal shaft to varying amounts, thus allowing the overall length of the shaft area to be adjusted. See, e.g., FIGS. 12 and 13. In certain embodiments, the TRLM is placed far enough distally in the telescoping tube such that it is present in the "overlap" area, i.e., the area where the proximal end of the distal tube is still within the distal end of the proximal tube even when the telescoping tube is extended to its greatest length.

Figure 11:
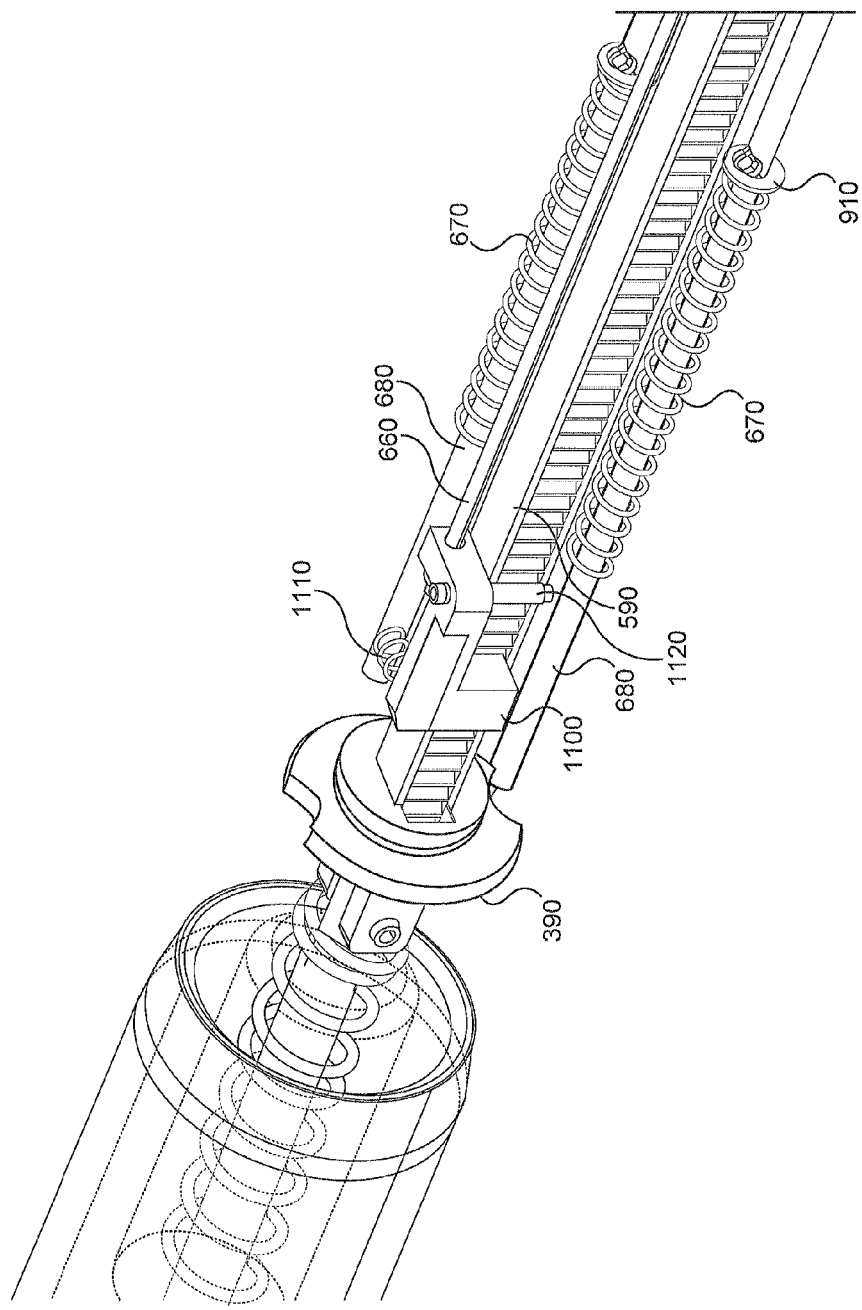
FIG. 11 displays example interior components of a portion of the telescoping tube region of an embodiment of the invention.

The TRLM typically comprises a body shaped to fit within the tubes of the telescoping tube region (e.g., shaped to fit within the smaller of the two tubes) and comprises components to allow a TRLM lever or similar component (which in turn is attached to a cable that is operably attached to the linkage lever in the handle) to connect with and disconnect with the toothed rod (which in turn is operably connected to the actuator rod and jaws of the device). Various embodiments of TRLMs are shown in, e.g., FIG. 6, 14, 16, etc. Cut away views of the TRLM are shown in, e.g., FIG. 7, 10, 12, 13, etc., while internal pieces of a TRLM are shown in FIGS. 11 (in place within the tube but without the TRLM body) and 14. Thus, in particular embodiments, the TRLM comprises a body (e.g., TRLM body 640), which has a opening that traverses it through which the toothed rod moves (e.g., opening 1620), openings for the stabilizer rods to traverse through the body (e.g., openings 1630), one or more flutings on the surface of the body which mate with the flutings in the telescoping tube (e.g., in the proximal and/or distal tube), an open space for the TRLM lever to fit within the body of the TRLM where the lever can operably interact with the toothed rod (opening 1610), a hole for the lever pivot pin (e.g., pin 1120) to be placed, an opening for the cable from the trigger to enter the TRLM (e.g., opening 900), a TRLM lever (e.g., lever 1100) which is described in more detail below, and a lever spring (e.g., 1110) which is also described in more detail below.

Figure 15:
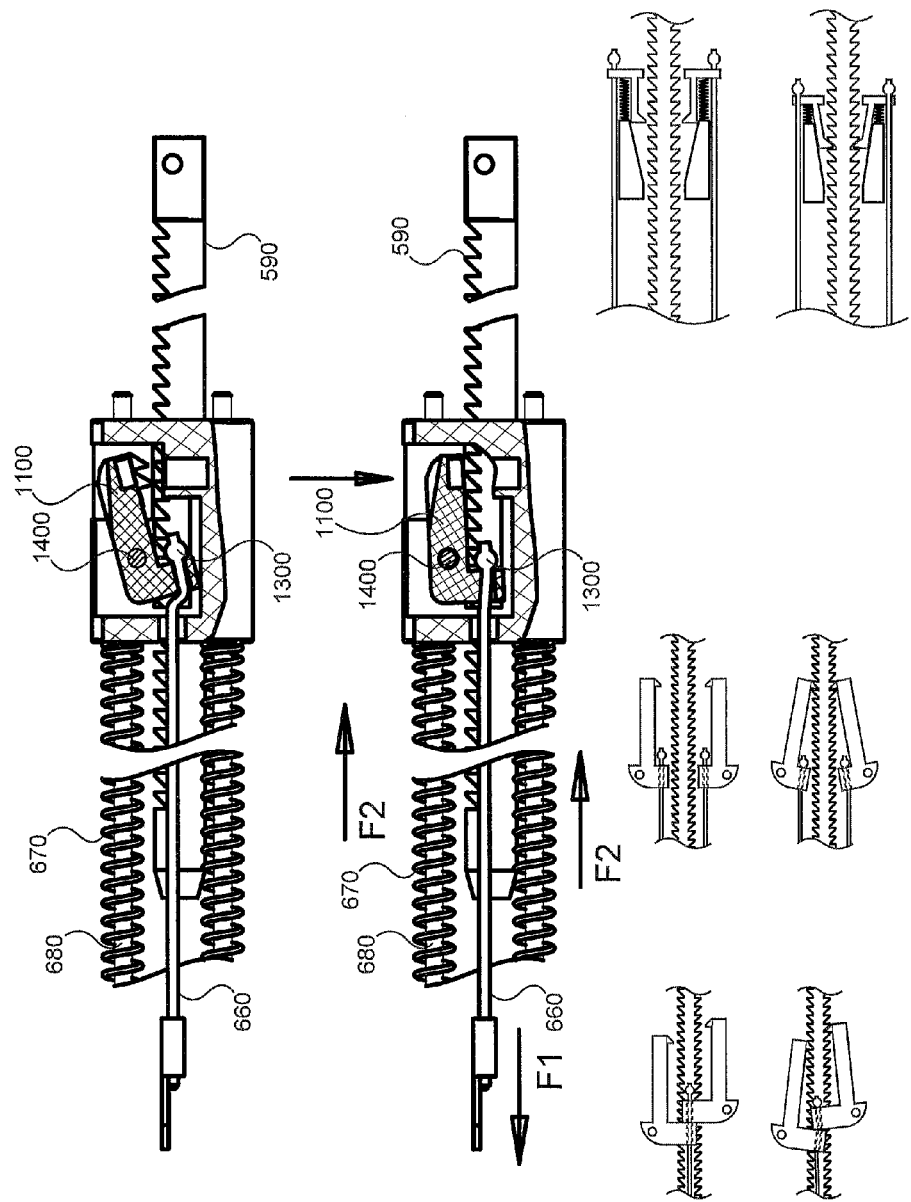
FIG. 15 shows movement of components of various different embodiments of the telescoping tube region during their use.

As stated, the TRLM lever can controllably interact with the toothed rod that traverses through the TRLM. In particular embodiments, the TRLM lever comprises one or more teeth that can operably interact with the teeth of the toothed rod, thereby holding the toothed rod in place when the teeth are engaged. As mentioned above, the TRLM can also comprise lever spring 1110, which acts to help disengage the TRLM lever (e.g., the teeth of the lever) from the teeth of the toothed rod when the trigger of the device is not being squeezed. In various embodiments the TRLM lever can comprise one tooth, two teeth, three teeth, or four or more teeth. It will be appreciated that in typical embodiments, the shape of the part of the TRLM lever that interacts with the toothed rod is configured to mate with the toothed rod. Thus, teeth on the TRLM lever can be of corresponding shape, depth, angle, etc. as teeth on the toothed rod so that they mate. See above. FIG. 16B illustrates several aspects of an example TRLM lever of the invention. TRLM lever 1100 is shown, as is opening 1650 where pivot pin 1120 enters (Cf. opening 1600 in TRLM body in FIG. 16A), opening 1640 where cable 660 passes through the lever, indentation 1660 where lever spring 1110 rests, and tooth ridges 1670 which mate with troughs in toothed rod 590. FIG. 15 illustrates several alternate embodiments of TRLM levers and toothed rods. FIG. 15B shows two embodiments each having two TRLM levers that interact with a toothed rod having a square cross-section and that has teeth on at least two sides. In one such embodiment, one cable interacts with both levers, while in the other embodiment, each lever has its own cable. Correspondingly, the cables shown in FIG. 15B for the embodiment with two cables, can both arise through bifurcation from the same cable (i.e., a third cable) which in turn connects to the linkage lever, etc., or each cable can be completely separate all the way to the connection on the linkage lever. FIG. 15C shows a cut away view of an embodiment comprising a circular lever (or collaret) which encircles a toothed rod that has a circular cross section and teeth all the way around the rod. It will be appreciated that the lever springs in the embodiment in FIG. 15C are orientated differently than those in, e.g., FIG. 15A, etc., but serve the same purpose (e.g., to disengage the TRLM lever from the toothed rod when the trigger is released). For purposes of clarity, in the embodiments shown in FIGS. 15B and C, the TRLM body is not shown. FIG. 15A illustrates the operation of the TRLM lever on the toothed rod when pressure is applied on the attached cable. As explained, when pressure is applied on cable 660 (because the trigger is squeezed), the cable pulls on lever 1100 which pivots at pin 1120 and engages it teeth into toothed rod 590.

Figure 9:
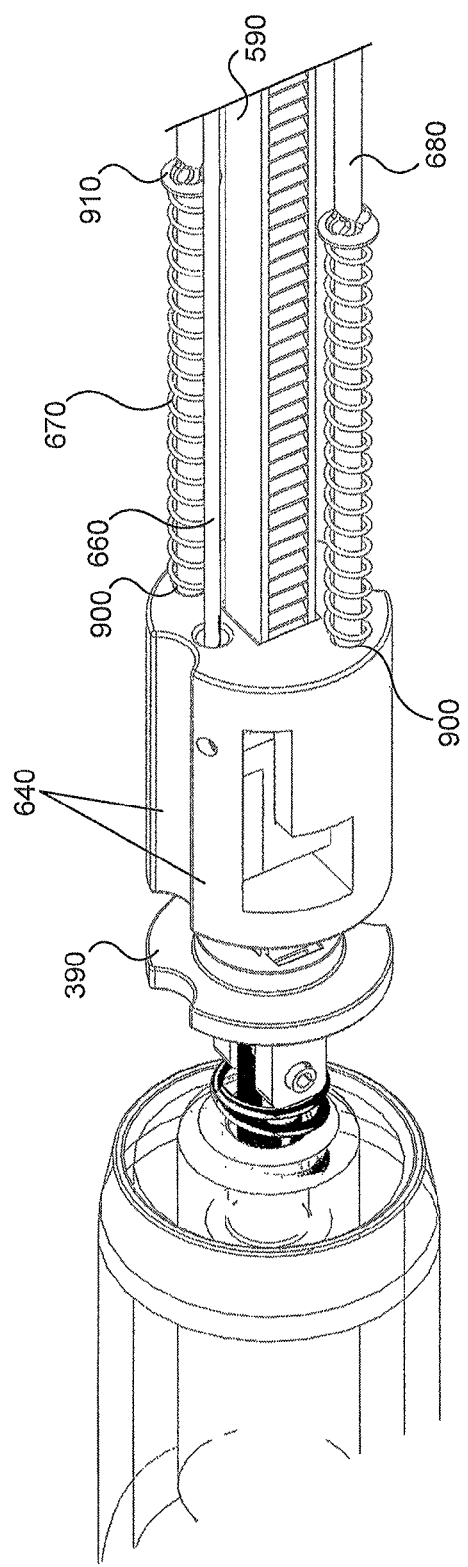
FIG. 9 displays example interior components of a portion of the telescoping tube region of an embodiment of the invention.

As stated above, the TRLM is held in place in the lumen of the telescoping tube by one or more stabilizer or holding rods. FIG. 9 shows stabilizing rods 680 surrounded by rod springs 670. In various embodiments, at their distal ends, the stabilizer rods enter into openings in the TRLM, e.g., via openings 1630, and freely traverse through the TRLM, while at their proximal ends they can be connected to a proximal plate, e.g., proximal plate 810 as in FIG. 18. In various embodiments, the rod springs can extend the full length of the stabilizer rods from the proximal plate to the TRLM, while in other embodiments, the rod springs can extend part of such distance, e.g., from the TRLM to a stop ring such as stop ring 910 in FIG. 9.

In typical usage of the devices herein, the TRLM is pulled proximally when the trigger is pulled (because the trigger pulls the cable which is attached to the TRLM). The distal end of the cable can optionally be bulbous or can comprise some other feature that keeps it within the TRLM. See, e.g., cable end 710 in FIGS. 13-15. When the TRLM is pulled proximally along the rods by the cable, it the compresses rod springs. As explained further below, when the trigger mechanism is released the cable is no longer pulled, and the rod springs can then optionally act to push the TRLM distally back to its position before the trigger was activated.

Figure 16A:
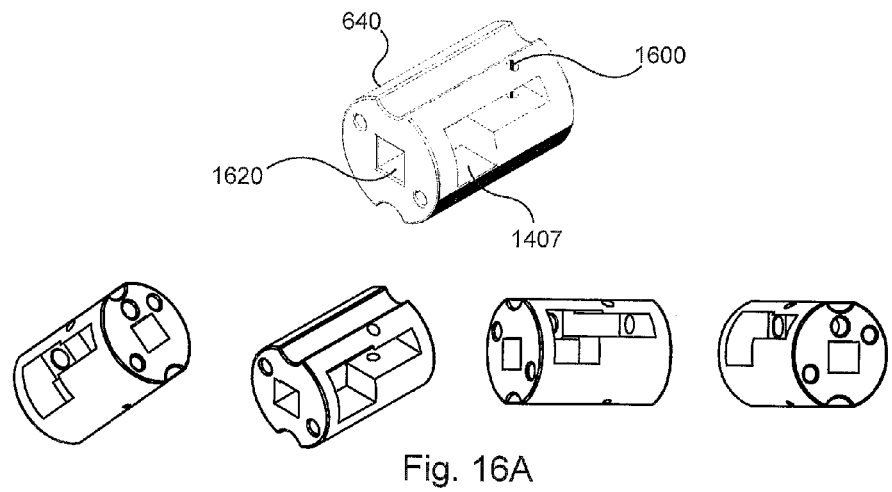
FIGS. 16A and 16B display isolated example components of the telescoping tube region of embodiments of the invention with FIG. 16A showing aspects of an exemplary toothed rod locking mechanism (TRLM) and FIG. 16B showing aspects of an exemplary TRLM lever.
Figure 16B:
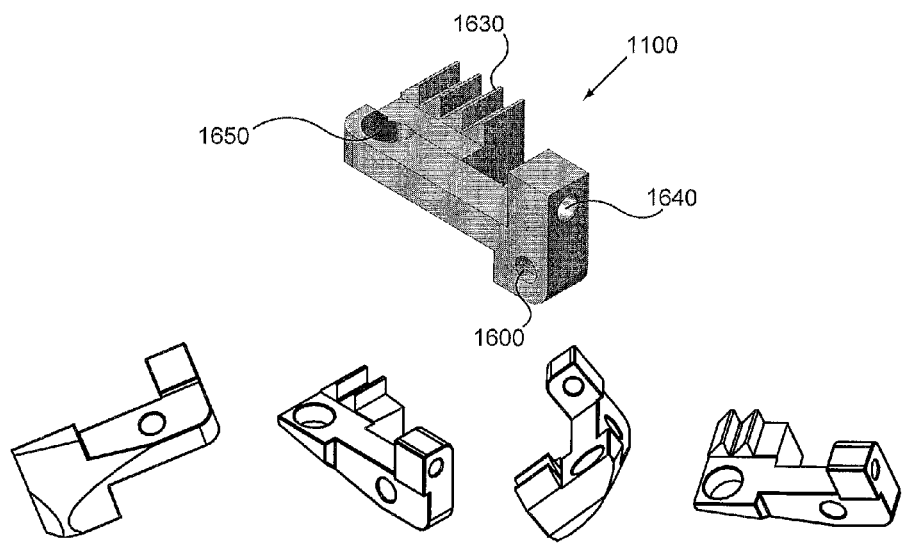

FIG. 16A displays several perspectives of an example TRLM. FIG. 16A shows TRLM body 640, along with opening 1610 where the TRLM lever is located, opening 1600 where pivot pin 1120 fits, openings 1630 (which it will be appreciated are present on both ends of the TRLM body) where the stabilizer rods traverse through the body, and opening 1620 where the toothed rod traverses the body.

Also in the various embodiments of the invention, a cable (e.g., cable 660) that is connected at its proximal end to the bottom of the linkage lever (i.e., the free end of the linkage lever closest to the handle base) and at its distal end to the TRLM lever in the TRLM. In some embodiments, the cable can be, e.g., a strap, an articulated strap, a wire, a woven wire, a braided wire, a chain, or other similar cable-like member. In some embodiments, the cable can comprise attachment loop 1400, or other similar configurations to aid in its connection to the linkage lever. See below.

Figure 10:
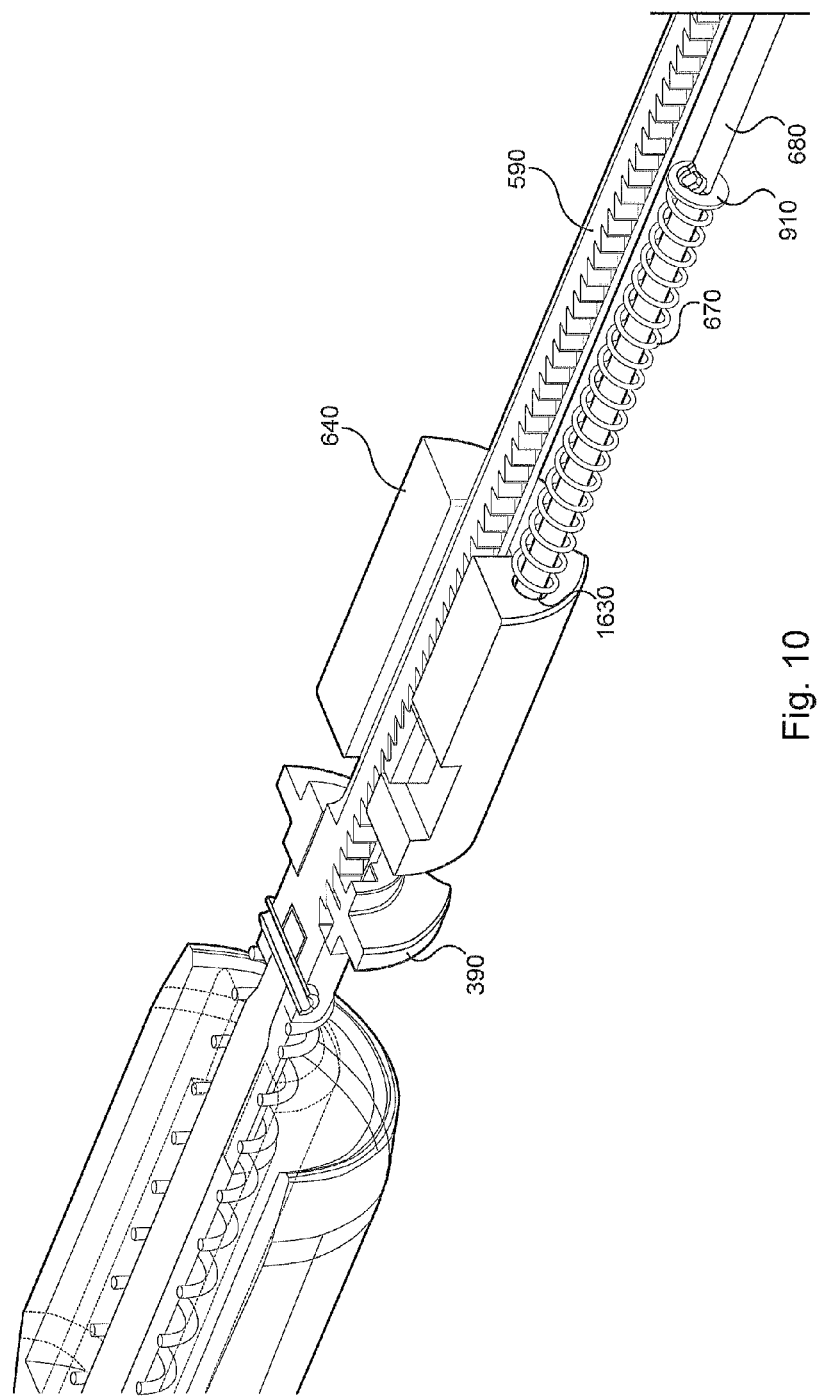
FIG. 10 displays a cut-away view of example interior components of a portion of the telescoping tube region of an embodiment of the invention.
Figure 18:
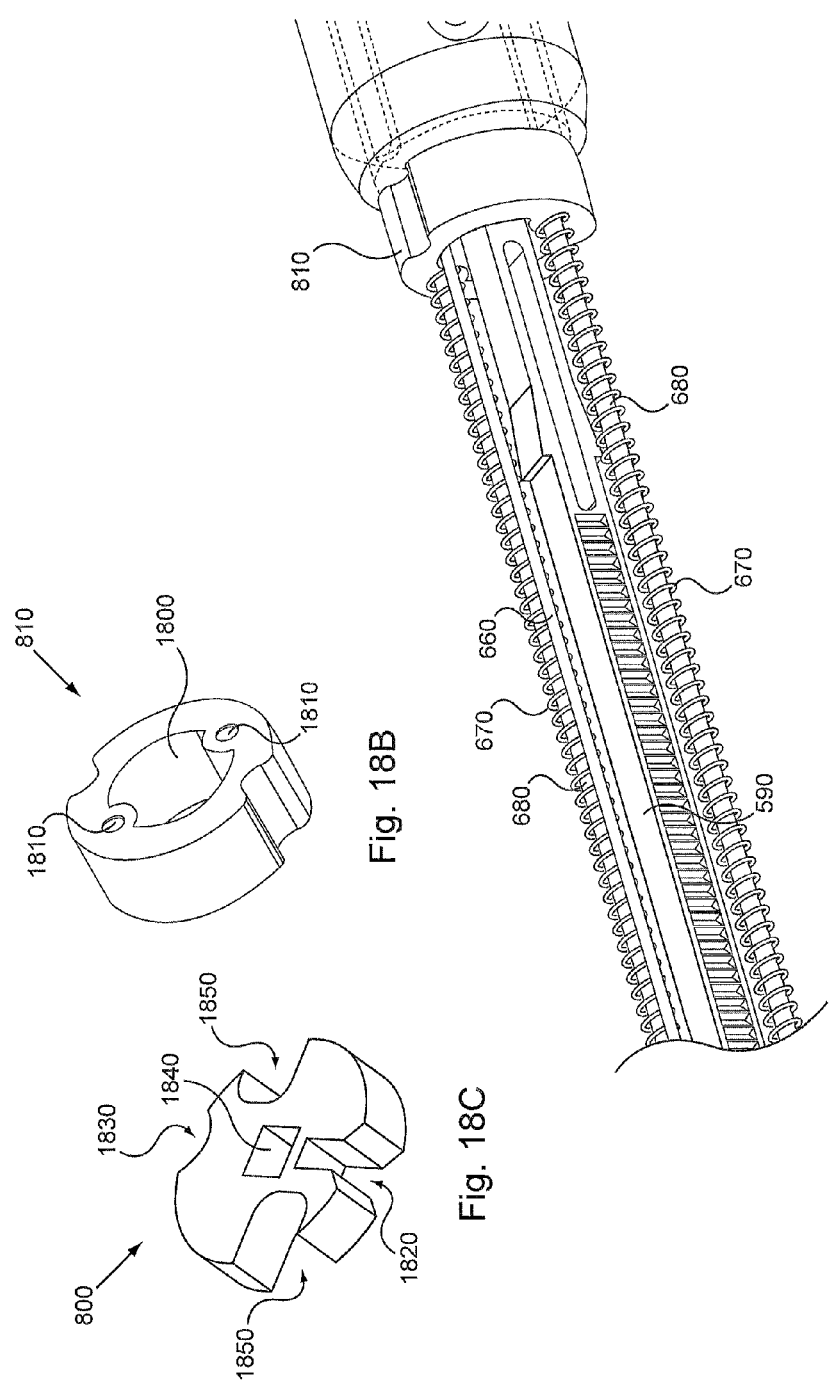
FIGS. 18A, 18B, and 18C display example components of the proximal end of the telescoping tube region (FIG. 18A) of an embodiment of the invention and isolated views of an example proximal end plate (FIG. 18B) and an example floating plate (FIG. 18C).

Some embodiments can also comprise various plates within the telescoping tube. For example, various embodiments of the invention include a distal plate, e.g., distal plate 390, attached around the toothed rod or around the proximal end of the actuator rod (see, e.g., FIGS. 3, 6, etc.). In some embodiments, the distal plate is placed around the proximal end of the actuator rod distal to the connection of the actuator rod and the toothed rod (see, e.g., FIG. 5) while in other embodiments, the distal plate can be placed around the toothed rod and can optionally comprise teeth or threads to keep it secure around the toothed rod (see, e.g., FIGS. 9 and 10). The various embodiments can also comprise a proximal plate (e.g., proximal plate 810) into which the stabilizer rods are attached and through which the proximal end of the toothed rod can optionally traverse (see, e.g., FIG. 18). As shown in FIG. 18, proximal plate 810 can comprise openings 1810 to receive the stabilizer rods and an opening 1800 through which the cable travels from the handle into the telescoping tube region. Furthermore, some embodiments can comprise a floating plate, e.g., floating plate 800 as in FIG. 8, which can help to guide the cable (e.g., cable 660) going to the TRLM and/or help keep the stabilizer rods and the rod springs properly orientated. Such floating plates can be placed around the toothed rod between the TRLM and the handle region. Various embodiments of the floating plate as shown in FIG. 18C can comprise fluting 1830 (which typically mates with the fluting of the tube, e.g., the smaller diameter tube), opening 1840 through which the toothed rod is threaded, slot 1820 through with the cable is placed and guided, and indentations 1850 through which the stabilizer rods and their springs are guided.

The toothed rod, the stabilizer rods, the rod springs, the floating plates, and the various components of the TRLM can be constructed from any of a number of materials, e.g., metal (e.g., aluminum, anodized aluminum, steel, stainless steel, magnesium, magnesium alloy(s), iron, metal alloys, and/or combinations thereof), plastic (e.g., a polycarbonate, a polyvinyl, a polyoxymethylene, Lexan, Delrin, etc.), a thermoplastic, a thermoplastic rubber, a thermoplastic elastomer, etc., ceramic, polymer, resin, wood, or any combinations thereof.

Figure 17:
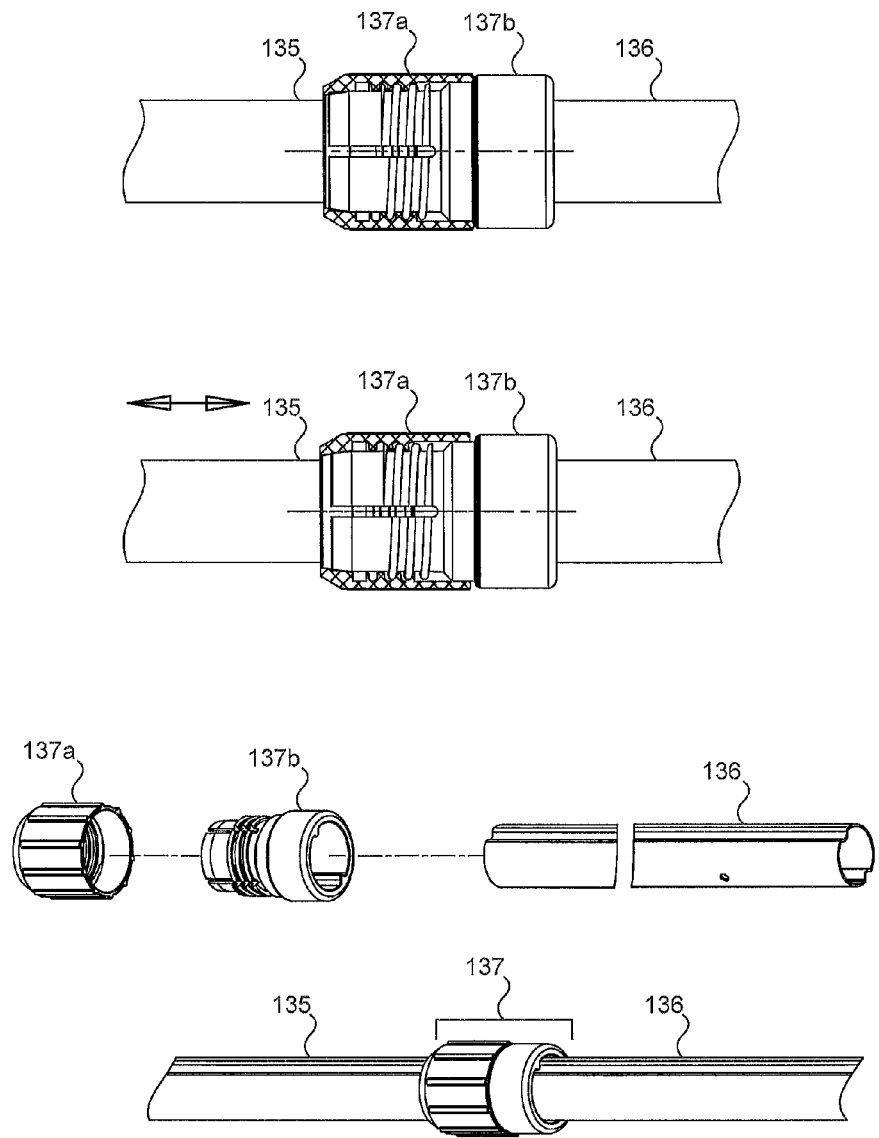
FIG. 17 displays an example tube locking mechanism of the telescoping tube region of an embodiment of the invention.

Tube locking mechanism 137 is shown as a threaded device in the Figures herein. Of course, it will be appreciated that the tube locking mechanism can alternatively comprise other formations to stably hold two (or more) joined shafts, which formations will be well known to those of skill in the art (e.g., common arrangements such as for extendable tripods, etc.). In the Figures, tube locking mechanism 137 is comprised of part 137*a* (attached to the distal tube) and part 137*b* (attached to the proximal tube). As can be seen in FIG. 17, flanges 1710 are separated by slits 1700 on tube locking mechanism part 137*b*. When, part 137*a* is threaded onto part 137*b*, it can optionally pinch the flanges closer together to therefore tightly grip onto the telescoping tubes.

In certain embodiments, the inner surface of the proximal end of the jaw base assembly (see, e.g., FIG. 5) can comprise one or more ridges, knobs, dots, or other similar raised protuberances that rest within (or beside) the flute(s) in the shaft(s). For example, ridges 570 can be seen in FIG. 5. Such ridges, etc. can act to stabilize the head region in a particular orientation in relation to the shaft. Furthermore, certain embodiments can comprise multiple ridges in the jaw base assembly mated with multiple flutes within the shaft, while some embodiments can comprise a greater number of flutes than of ridges. In certain embodiments, the jaw base assembly and the shaft are not permanently affixed (e.g., they are not welded, glued together, etc.), but rather they are held together by, e.g., the presence and connections of the internal mechanism (e.g., the jaw actuator, jaw actuator rod, toothed rod, etc.), the friction between the tube and the jaw base assembly, etc. Thus, in some embodiments, the internal connections through the shaft region allow play in length. Thus, the head region can be pulled slightly out (e.g., away from the distal end of the distal shaft) so that the ridge(s) within the flute(s) stabilizing the head region are removed from the flute(s). Thus, the head region can then be rotated and then moved back towards the shaft so that the ridge(s) re-enter different flute(s) and stabilize the rotated head region in a new and different orientation in relation to the shaft/handle. It will be appreciated that some embodiments comprise a plurality of flutes and ridges thus allowing a fine degree of control over head rotation. In some such embodiments, the actuator rod interacts with the jaw actuator cap such that they do not prohibit rotation of the head region (e.g., the activator cap freely circles around the jaw actuator rod, etc.).

In some embodiments, the user is unable to completely remove distal tube 135 from proximal tube 136. While the head of the device can optionally be pulled distally far enough to rotate, typically neither the head region nor tube 135 are completely removable once assembled. Wingnuts or flanged components, e.g., flanges on the proximal end of the toothed rod, or pins on the proximal end of the toothed rod, can optionally keep the toothed rod (and thus the head region and/or distal tube) from complete removal. Such optional flanging, etc. can block such removal by interaction with the TRLM, etc.

Again, within the telescoping tube, the toothed rod is attached at its distal end to the jaw actuator rod. Such attachment can be by hook arrangement or by pins, crimping, clipping, welding, adhesive/glue, or any other appropriate method. See, e.g., FIG. 8. In some embodiments, the toothed rod and the jaw actuator rod can be connected through one or more intermediary(ies) (e.g., another cable, etc.) At its proximal end, the toothed rod traverses the TRLM and can be attached to a cable at variable places along its length indirectly via the TRLM lever, etc. See below. The cable, which traverses the proximal tube enters the handle of the device and interacts with the lever linkage. See below. As stated, in various embodiments, the components within the tube/shaft, e.g. cable, TRLM, toothed rod, etc., comprise stainless steel, while in other embodiments they comprise a metal (aluminum, anodized aluminum, steel, magnesium, magnesium alloy(s), iron, or various alloys), plastics (e.g., polyoxymethylene, Delrin, Lexan), polycarbonates, nylon, and/or combinations thereof.

Head Region

As mentioned above, typical aspects and components of the head region, are applicable to a number of various embodiments of adjustable length devices of the invention. Thus, for example, aspects of different embodiments of head regions can optionally be paired with different embodiments of handle regions (e.g., a handle region comprising a locking mechanism or a handle region not comprising a locking mechanism). Relation of the head region with the other regions of example embodiments can be seen in, e.g., FIGS. 1 and 2, while various components of the head region can be seen in, e.g., FIGS. 3, 4 (showing an exploded view), and 5 (showing a cut away view).

At the distal end of the device (i.e., the end furthest from the handle region and typically the region furthest from the user when held by the handle) grasping jaw members, e.g., jaws 120, of the device oppose one another and form a modified "U" shape when open (e.g., when an object is not being grasped) and form a five-sided or pentagonal shape when closed (e.g., when an object is being grasped or when the jaw members are brought together without grasping an object). As explained more fully below, such shape can aid in grasping a wide range of differently sized objects. Additionally, the jaw shape and arrangement of the jaws (as well as the surface layers, pads, etc.) add aesthetic interest to the device (e.g., through shape and optionally through colors and/or textures of the various components, contrast in color/texture between various areas, etc.). The outer surfaces of the jaw members can optionally be ridged or braced with one or more ribs or the like, e.g., in order to strengthen the members. See, e.g., FIG. 1. In certain embodiments, the jaw members are constructed all of one piece. The jaw members can also comprise an overmolded inner layer, or inner surface layer. See below. In certain embodiments, the distal end of each jaw member comprises end region or tip 111, which optionally can be attached to the main body of the jaw member via flexible hinge 110. In other embodiments, the tip is attached or connected to the main body of the jaw member via a nonflexible region, i.e., such embodiments do not comprise a flexible hinge at the region where the tip and the main jaw body intersect.

In certain embodiments, the inner surfaces of the jaw members can comprise inner surface layer 115, e.g., to aid in gripping of objects. The texture of the inner surface layer can be dimpled, roughened, ridged, striated, can comprise bumps or raised dots, or can comprise any other three-dimensional surface texture. In certain embodiments, the inner surface layer comprises a flexible or malleable/conformable surface. Thus, the inner surface layer can also conform at least partially to an object being grasped and thereby help prevent slippage, etc. whether or not the surfaces are "textured." The inner surface layers can be composed of material having a high coefficient of friction to aid in gripping of objects. Additionally, the inner surface layers can comprise one or more coatings to aid in gripping of objects. Such coatings can also comprise those having high coefficients of friction or the like.

In certain embodiments, the jaw members optionally do not comprise an inner surface layer. In other words, in such embodiments, the inner surfaces of the jaw members themselves grasp objects and the inner surfaces of the jaw members can be textured (e.g., dimpled, etc.) and/or coated. Thus, in such embodiments, the jaw members can be textured on their inner surfaces rather than being mated with (e.g., through overmolding or adhesion) another inner surface layer of textured material, etc.

When the jaw members are fully closed (e.g., when an object is being grasped or when the device is closed without grasping an object), pad areas 105, can meet one another over substantially their entire surfaces. In some embodiments, the pad areas can optionally meet/touch one another at their distal ends (e.g., when the jaws are brought together lightly or partially) and over substantially their entire areas when the jaws are brought together completely or more fully. It will be appreciated that the tips and pads of the jaw members allow grasping of quite small objects and that the tips and/or the pads can optionally flex and/or conform at least partially to the shape of objects being grasped. In certain embodiments, the pad area is continuous with, and/or part of, the inner surface layer of the jaw member and can be composed of the same material. In certain embodiments, such material (i.e., which composes the pad and/or the inner surface layer of the jaw member) can be overmolded onto the jaw members, thus forming one solid piece for each jaw member.

As stated, in certain embodiments, the inner surfaces of the jaw members and/or the pads can comprise one or more overmolded pieces of material that comprise the inner surface layer. In other embodiments, the inner surface layers of the jaw members and/or the pads can comprise a material (e.g., comprising an inner surface layer, e.g., a textured surface), which is attached (e.g., via glue/adhesive or via studs/brackets/pins/etc.) to the jaw member rather than overmolded.

The jaw members can optionally be constructed from a number of materials. In certain embodiments, the jaw members comprise Lexan® (available from General Electric, Fairfield, Conn.), while in other embodiments, the jaw members can comprise a polyoxymethylene such as Delrin® (available from E.I. du Pont de Nemours and Company, Wilmington, Del.). In certain embodiments, the jaw members can comprise metal (e.g., aluminum, anodized aluminum, steel, stainless steel, magnesium, magnesium alloy(s), iron, metal alloys, and/or combinations thereof), plastic (e.g., a polycarbonate, a polyvinyl, a polyoxymethylene), a thermoplastic, a thermoplastic rubber, a thermoplastic elastomer, etc., ceramic, polymer, resin, wood, or any combinations thereof. In various embodiments, the inner surface layers of the jaw members, and/or the pads, can comprise the same material as the jaw members or they can comprise a different material than the main body of the jaw members. In particular embodiments, the inner surface layers can comprise one or more of: a thermoplastic rubber (TPR), a thermoplastic elastomer (TPE), a silicon rubber, or a rubber. The composition of the inner surface layers and/or the pads is optionally chosen for one or more characteristic such as durability, gripping ability (e.g., a "no-slip" surface), aesthetic interest, etc. In certain embodiments, the inner surface layer and/or pads are textured and/or colored (optionally the same as other parts of the device such as the trigger, palm area on the back of the handle, etc. (e.g., to add additional aesthetic interest). In some embodiments the inner surface layers and/or the pads comprise Lexan, Delrin, metal (e.g., aluminum, anodized aluminum, steel, stainless steel, magnesium, magnesium alloy(s), iron, metal alloy(s), and/or combinations thereof), plastic (e.g., a polycarbonate, a polyvinyl, a polyoxymethylene), a thermoplastic, a thermoplastic elastomer, a thermoplastic rubber, etc., ceramic, polymer, resin, wood, or any combinations thereof. In some embodiments, the main body of the jaw members comprises polyoxymethylene, Lexan, or Delrin while the inner surface layers and the pads comprise TPR or TPE.

In certain embodiments, the jaws can open to a maximum distance of at least 6 inches or more from tip to tip (e.g., from tip of pad to tip of pad), to at least 5.5 inches or more from tip to tip, to at least 5 inches or more from tip to tip, to at least 4 inches or more from tip to tip, to at least 3 inches or more from tip to tip, to at least 2 inches or more from tip to tip, or to at least 1 inch or more from tip to tip.

Figure 3:
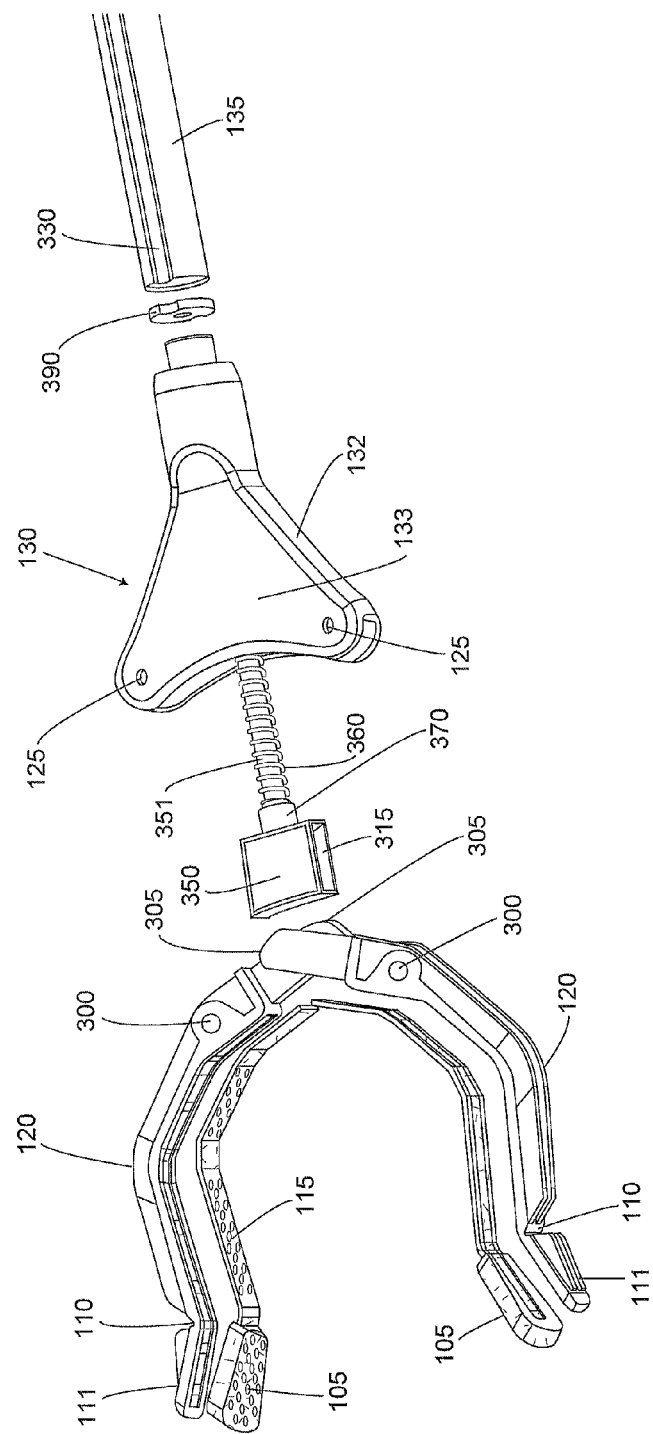
FIG. 3 displays various components of the head region and a portion of the distal part of the telescoping tube region of an example embodiment of an adjustable length pick up device of the invention.
Figure 4:
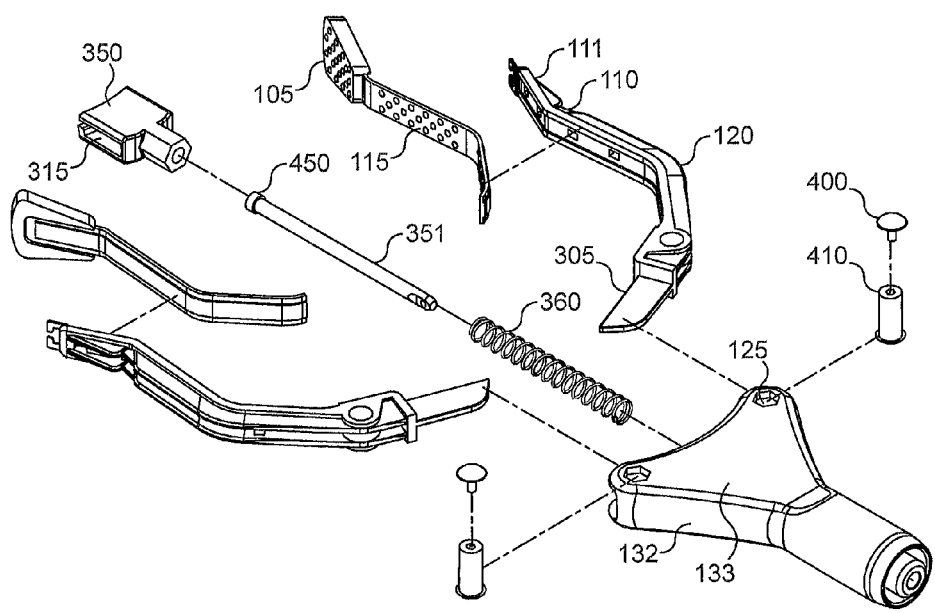
FIG. 4 displays an exploded view of various components of the head region of an example embodiment of the invention.

As can be seen in FIG. 3, proximal ends 305 of the jaw members (i.e., the ends of the jaw members closest to the handle) overlap one another within jaw actuator (or clevis), 350. The proximal ends of the jaw members enter through side openings 315 in the jaw actuator. The jaw actuator keeps the proximal ends of the jaw members secure and in the correct orientation. The jaw members rotate around pivot points 300 (in the jaw members) which optionally correspond with pivot points 125 (in the jaw assembly) where bolts, screws, or other fasteners (such as pin 410 and cap 400) secure and/or position the pivoting jaw members to the jaw base assembly. See FIG. 4.

The jaw actuator and the proximal ends of the jaw members are enclosed within jaw base assembly 130. The jaw base assembly comprises two opposing sides 133 (shown as roughly triangular in the attached figures), separated by enclosing sidewall(s) 132. In certain embodiments, the jaw base assembly is molded or fashioned out of one piece of material and is not constructed from smaller pieces. In some embodiments, the jaw base assembly can be composed of separate top, bottom, and sidepieces which are secured together (e.g., via glue, adhesive, fasteners, melting, welding, spot welding, etc.). Of course, it will be appreciated that such triangular shape should not necessarily be taken as limiting on the invention and that the jaw base assembly can also comprise different shapes (e.g., circular, square, oval, etc.) and does not necessarily have to have vertical side walls, etc.

The jaw actuator holding the proximal ends of the jaw members is attached, via jaw actuator cap 370 to jaw actuator rod 351 which, in turn, is surrounded by jaw actuator spring 360. Both the spring (e.g., a compression spring) and the rod are housed within the interior of the jaw base assembly. However, in some embodiments, the proximal end of the jaw actuator rod and/or the jaw actuator spring can extend into the hollow tube region of the device. See below. Also, it will be appreciated that in some embodiments, the jaw actuator cap does not comprise a separate piece, but is rather a continuation of the jaw actuator. Also, in some embodiments, the distal end of the actuator rod (e.g., end 450) is a separate piece, while in other embodiments, it is merely an enlarged end of the actuator rod. The distal end of the spring pushes against the jaw actuator (e.g., by pushing against the jaw actuator cap), while the proximal end of the spring pushes against stop plate 500, or other similar plate, within the jaw base assembly. See FIG. 5. Because the spring pushes against both the jaw actuator and the stop plate, it forces the jaw members apart (i.e., away from one another) when the device is not being triggered (i.e., when the trigger is not squeezed and/or latched). See below.

While, as shown by the dashed motion lines in FIG. 1, the jaw members can move towards or away from one another, it will additionally be appreciated that in certain embodiments, the entire head region of the device can be rotated or pivoted around the elongated tube. See below. Such action can allow proper orientation of the jaws to grasp specific objects. Cf. FIG. 1 and FIG. 2.

In various embodiments, one or more of the jaw actuator, jaw base assembly, jaw actuator cap, jaw actuator rod, and spring can be composed of, e.g., metal (such as aluminum, anodized aluminum, steel, stainless steel, magnesium, magnesium alloy(s), iron, metal alloy(s), and/or combinations thereof), plastic (e.g., a polycarbonate, a polyvinyl, a thermoplastic, a thermoplastic elastomer, a thermoplastic rubber, a polyoxymethylene, Lexan, Delrin, etc.), ceramic, polymer, resin, wood, or any combinations thereof. In certain embodiments, the jaw actuator, jaw base assembly, jaw actuator cap, and jaw actuator rod are comprised of plastic(s) (e.g., polyoxymethylene, Lexan and/or Delrin), while the spring is comprised of a metal (e.g., stainless steel, aluminum, anodized aluminum, iron, magnesium, magnesium alloy(s), steel, metal alloy(s), and/or combinations thereof). In some embodiments, the jaw actuator, jaw actuator cap, jaw actuator rod, and spring are comprised of metal (such as aluminum, anodized aluminum, steel, stainless steel, magnesium, magnesium alloy(s), iron, metal alloy(s), and/or combinations thereof) while the jaw base assembly is comprised of plastic (e.g., polyoxymethylene, Lexan and/or Delrin).

As explained in more detail above, the jaw actuator rod 351 is attached to toothed rod 590 which traverses through adjustable length tube regions 135 and 136 and is operably and controllably attached to cable (or in some embodiments, rod, strap, articulated strap, wire, chain, or other similar cable-like element) 660 via the TRLM. See above.

Handle Region

Figure 8:
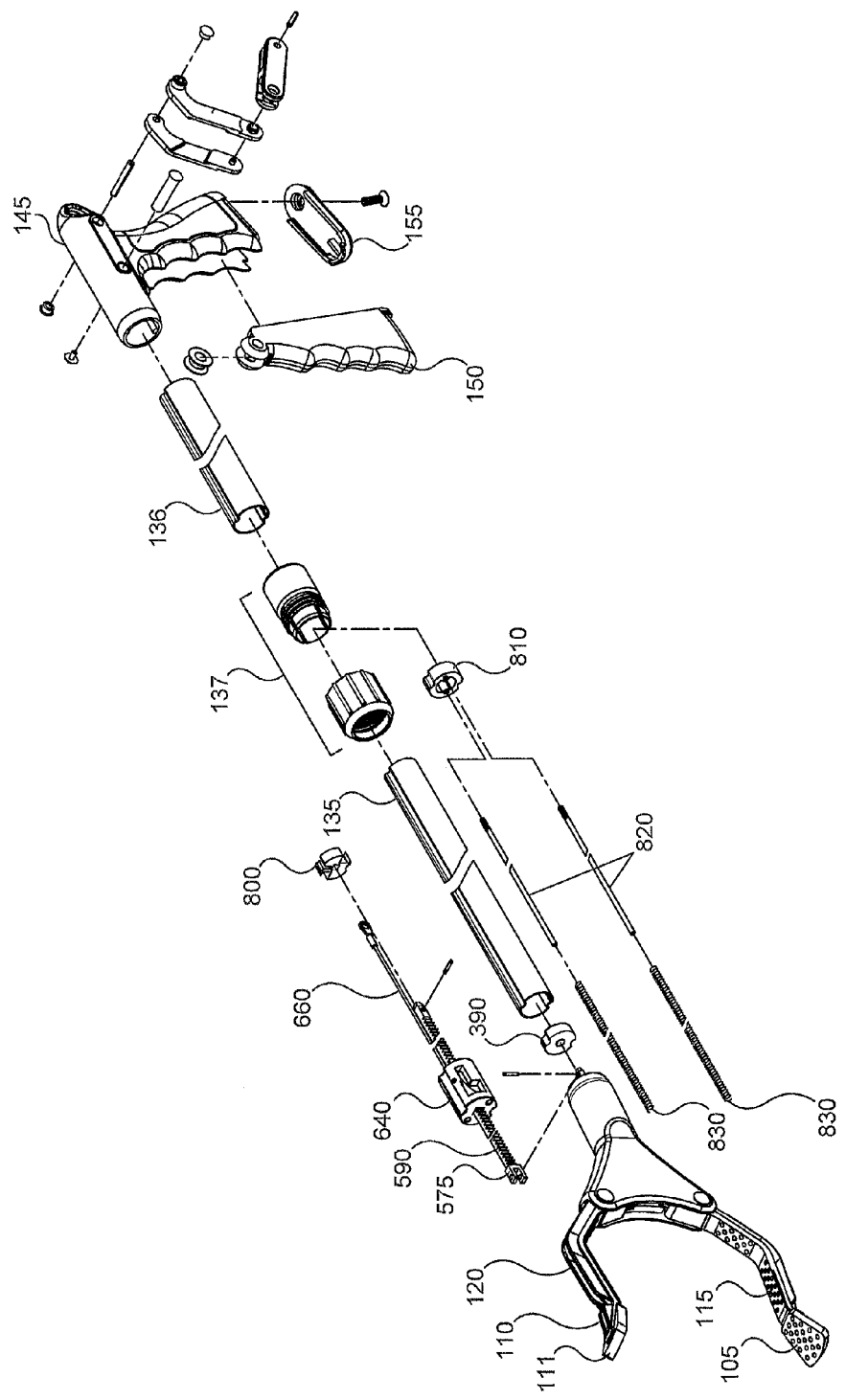
FIG. 8 displays an exploded view of example embodiment of an adjustable length pick up device not having a jaw locking mechanism and with the jaws of the device orientated vertically. Cf.

As can be seen in the accompanying figures, the handle region (region C in FIG. 1) comprises a number of features and a number of different embodiments (e.g., devices with or without a locking mechanism to hold the jaws in place even when the trigger grip is not squeezed). The handle itself comprises a form designed to be grasped by the hand of a user. In certain embodiments, handle body 145 is comprised from a single piece of material, with handle cap 155 and trigger grip (or "trigger") 150, being attached to the single body of the handle. When present, optional latch lever 140 can also be comprised from a separate piece of material. Such single piece construction of the handle body can aid in strength and stability of the device. However, in other embodiments, the handle body can be constructed from a number of pieces, e.g., two mirrored pieces which are fitted together and to which are attached the handle cap, optional latch lever, and trigger grip, etc. In some embodiments, the handle comprises a hook or ring feature to allow the device to be hung or to have a cord/lanyard attached to the device (e.g., to allow the device to be hung). Thus, optional ring 165 is shown in the figures. FIGS. 1, 2 and 8 show the spatial relationship between the handle region and the other regions of the device, while Figures such as 19-24 show various example components of different embodiments of handle regions (e.g., embodiments comprising latching mechanisms in FIGS. 22-24 and embodiments that do not comprise latching mechanisms in FIGS. 20 and 21).

Trigger grip 150, (also referred to as trigger 150) in certain embodiments, comprises two mirrored pieces which are joined together (e.g., by adhesives, temperature setting or melting, friction forces, etc.) or are placed adjacent to one another, but not joined. Other embodiments can comprise a trigger grip which is comprised of a single formed piece. In either case, such trigger grip is typically ergonomically shaped to allow for easy finger placement for the user and for aesthetic style. Thus, as can be seen from the figures, the trigger grip can comprise raised ridges and depressions for finger placement. It will also be appreciated that the sides of the handle body (alternatively and/or in addition to the trigger) can comprise ridges and other shapes to produce an ergonomic grip. The trigger grip attaches to the handle body at a pivot point (e.g., pivot point 2111). See, e.g., FIGS. 20, 21, and 22.

In some embodiments (e.g., those comprising a latching mechanism), pivot point 2111 exists where the trigger is attached to the handle body. At such point, a pin (e.g., pin 2103 and its corresponding pin cap(s) 2104) can be threaded through openings in the trigger grip pivot areas (e.g., pivot areas 2208) to which the locking latches (e.g., latches 140) are attached. See, e.g., FIGS. 22 and 23. In other embodiments, e.g., those that do not comprise a jaw latching mechanism, a pin (e.g., pin 2103 and its corresponding pin cap(s) 2104) can also be used to pivot the trigger grip pivot areas around at pivot point 2111. See, e.g., FIGS. 20 and 21. In the various embodiments, when the trigger grip pivots from the pivot point, the base of the trigger grip slides into the body of the handle when the trigger is squeezed by a user. As will be appreciated, the interaction of the handle and the trigger typically does not present sharp edges or openings where a user's fingers could be pinched or injured. As explained further below, when the trigger grip is squeezed and moves into the handle body, the linkage lever and the optional latching lever are moved as well.

Also attached to the handle body is an optional latching lever (e.g., lever 140). As mentioned, in embodiments where it is present, the latching lever(s) are attached to a pin that threads through openings in the trigger grip pivot areas (e.g., areas 2208) and the handle body at pivot point 2111. The latching lever(s) are placed on one or both ends of the shaft (i.e., on either one or both sides of the handle body). See FIG. 23.

The handle cap is attached at the base of the handle body. The cap (e.g., cap 155) is secured to the base via a screw (e.g., screw 2000), or similar fastener in various embodiments. However, in other embodiments, the cap is attached to the handle body by adhesives, temperature setting, friction forces, etc. and optionally does not comprise a screw or the like. In embodiments comprising a latching mechanism, the handle cap optionally comprises a latch recess area (e.g., area 2410) into which the optional latch fits when the device jaws are locked. See below.

In various embodiments, the handle body, handle cap, trigger grip, and optional lever latch are comprised of or comprise, e.g., metal (e.g., aluminum, anodized aluminum, steel, stainless steel, magnesium, magnesium alloy(s), iron, metal alloy(s)), plastic (e.g., a polycarbonate, a polyvinyl, a thermoplastic, a thermoplastic elastomer, a thermoplastic rubber, a polyoxymethylene, Lexan, Delrin, etc.), ceramic, polymer, resin, or any combinations thereof. In certain embodiments the handle body, handle cap, trigger grip, and optional lever latch are comprised of polyoxymethylene, Lexan, and/or Delrin. In yet other embodiments, the handle body, handle cap, trigger grip, and optional lever latch are comprised of a polyoxymethylene, Lexan and/or Delrin while palm rest area 160 (and optionally the trigger grip) also comprises an overmolded layer of thermoplastic rubber or thermoplastic elastomer for improved gripping, comfort, and/or aesthetics. In yet other embodiments, the palm rest on the back of the handle (and optionally the trigger grip) comprises a thermoplastic rubber or a thermoplastic elastomer.

As can be seen in the figures, the cable (e.g., cable 660) and the linkage lever (which comprises upper linkage 2201 and lower linkage 2203, which collectively comprise the leverage action mechanism) are also comprised within the handle body. As stated previously, the cable is attached within the telescoping tube at its distal end to the TRLM and the TRLM lever. In the various embodiments, the proximal end of the cable enters the handle body, rests upon a roller or pin, traverses the length of the interior of the handle, and attaches to the free end of the lower linkage lever at an attachment point (e.g., point 2180). The end of the cable can be attached to the free end of the linkage lever via pin 2100, etc.

In particular embodiments comprising a locking/latching mechanism (see, e.g., FIGS. 23 and 24), the proximal end of the cable enters the handle body, rests upon a roller (e.g., roller 2335) which optionally encircles a pin (e.g., pin 2103) and which is between 2 wings or walls of a latching disc (e.g., latching disc 2375), traverses the length of the interior of the handle and attaches to the free end of the lower linkage lever (e.g., at point 2180). In some such embodiments, the cable can rest directly upon the pin (e.g., pin 2103) rather than upon a roller such as roller 2335. As can be seen from FIGS. 23 and 24, the cable can be kept in place on the roller (or pin) by sidewalls or wings of the latching disc (e.g., disc 2375). FIG. 24 shows a transverse cut away view of the area. In various embodiments, the roller on which the cable rests can be a separate piece from the latching disc or can be part of the latching disc. The latching disc is typically sandwiched between the trigger grip pivot areas (e.g., areas 2208). See FIGS. 22 and 23.

In particular embodiments that do not comprise a locking/latching mechanism (see, e.g., FIG. 21), the proximal end of the cable enters the handle body, rests upon a roller (e.g., roller 2105) which encircles a pin (e.g., pin 2103). The roller can comprise two wings (see FIG. 21) which help to keep the cable in place. In other such embodiments, however, the cable can merely rest upon the pin and be kept in place by the trigger grip pivot areas (e.g., areas 2208). The cable traverses the length of the interior of the handle, and attaches to the free end of the lower linkage lever at an attachment point (e.g., point 2180). The end of the cable can be attached to the free end of the linkage lever via pin 2100, etc.

Figure 19:
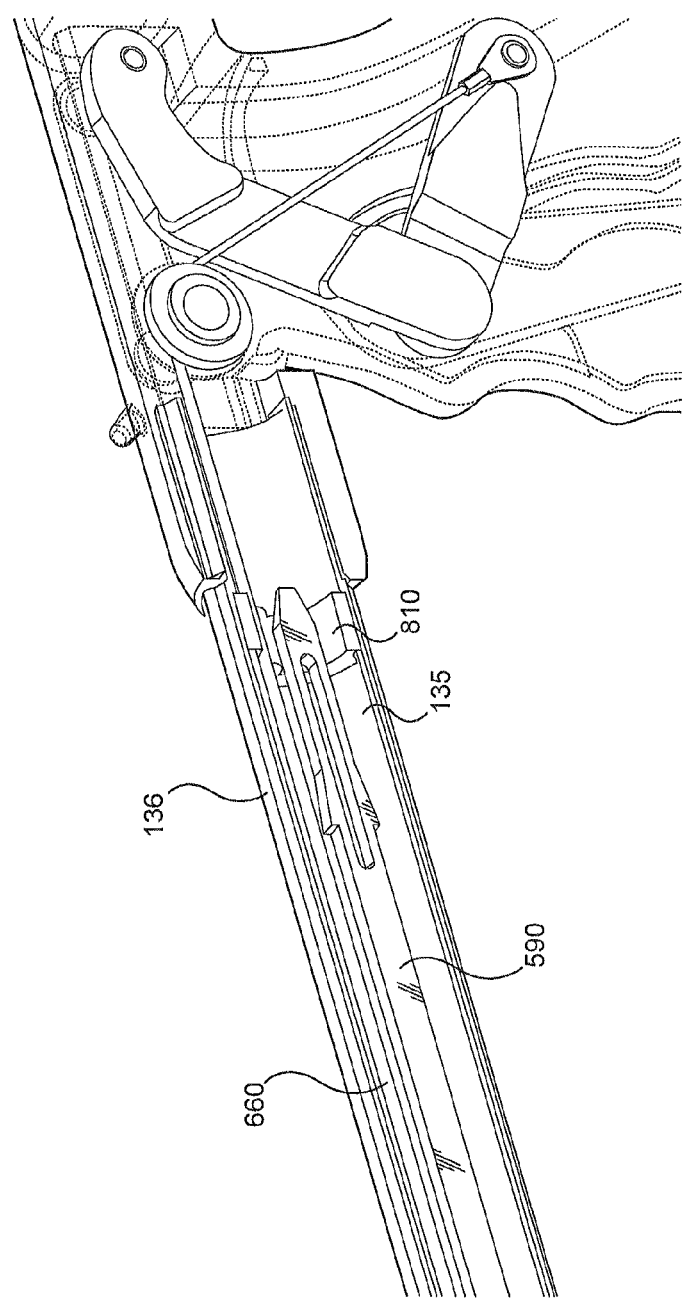
FIG. 19 displays example components of the proximal end of the telescoping tube region and a portion of the handle region of an embodiment of the invention.
Figure 21:
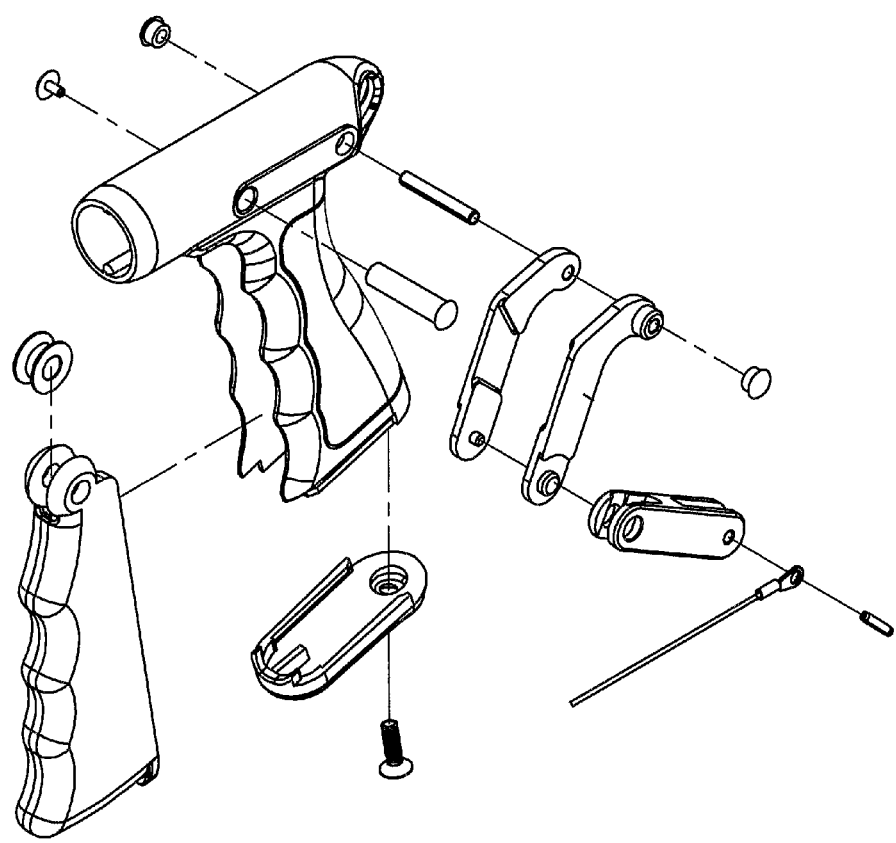
FIG. 21 displays an exploded view of example components of the handle region of an embodiment of the invention (not having a locking/latching mechanism).
Figure 22:
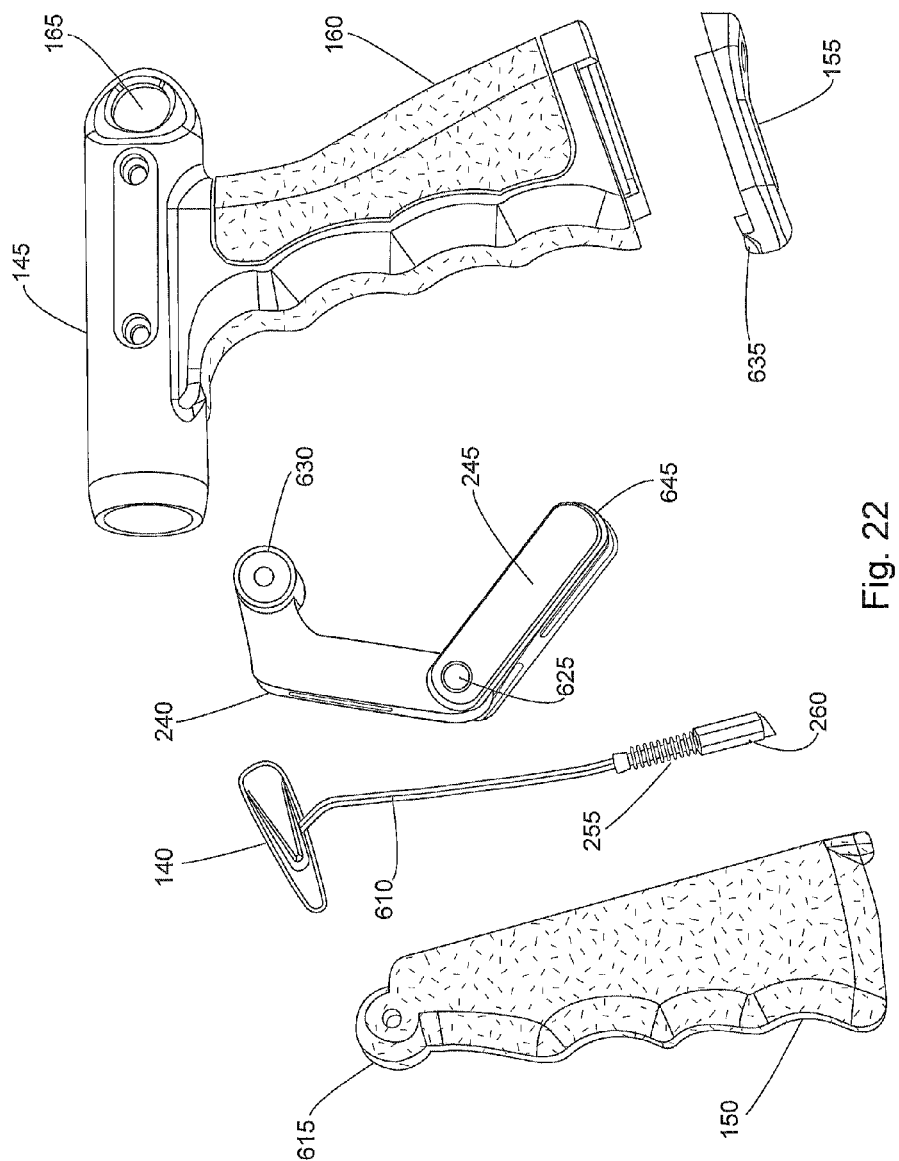
FIG. 22 displays various components an example handle region of an embodiment of the invention (having a jaw locking/latching mechanism.
Figure 23:
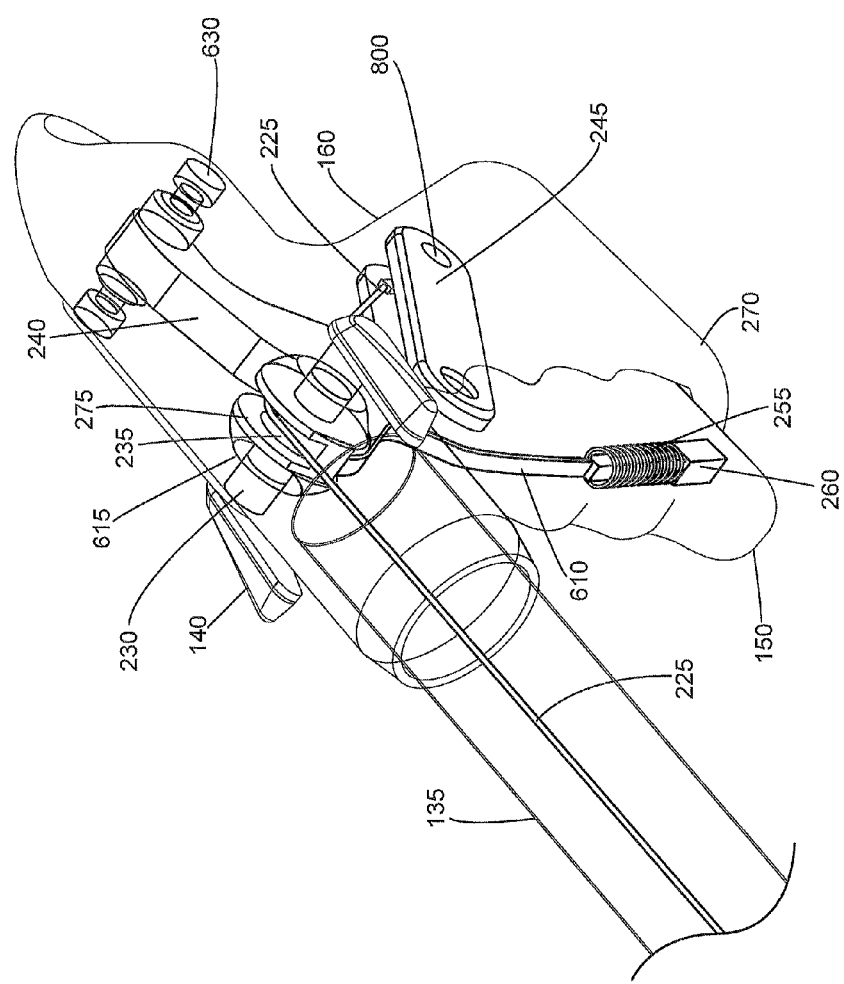
FIG. 23 displays various components of the handle region of an example embodiment of the invention (having a locking/latching mechanism).

In the various embodiments herein (both with or without latching mechanisms), the linkage lever is moveably hinged at the top (e.g., 2202) and middle (e.g., 2205), while free at the end (e.g., 2204) nearest the handle cap. In certain embodiments, pin 2101 and pin caps 2102 can fasten the top of the linkage lever. See, e.g., FIG. 21. In certain embodiments, the free end of the linkage lever moves within a track or groove within the handle body or within the free space present within the handle body. Thus, the lever is movable when the trigger grip is squeezed. When the grip is squeezed, pressure is applied by the grip upon the lever, which is pushed backwards and stretches out (e.g., free end 2204 moves towards the handle cap at the base of the handle body), thus, pulling the attached cable (hence the trigger is a leverage action trigger). In certain embodiments (including embodiments either with or without latching mechanisms), the joint between the upper and lower linkages slides along a slope (e.g., slope 2440) on the inner wall of the trigger, thereby producing a smooth action of pulling on the cable. FIGS. 21, 23, etc. show cut away views of embodiments wherein the lower linkage lever comprises two mated, mirrored parts, through which the cable (cable 660) traverses. The various embodiments can also comprise a upper linkage lever that optionally comprises a single piece having a slot or opening through which the cable traverses or can comprises two mated mirrored parts. In other embodiments, the linkage lever can comprise, e.g., 2 single pieces (rather than the doubled pieces shown in the current figures) that are hinged and have the cable attached to the lower end, etc. FIGS. 19, 21, and 22 give various views/embodiments of the linkage lever in handle region of example adjustable length devices of the invention.

Also within the handle body is the optional latching mechanism. The latching mechanism comprises latching lever 140, pin 2103 (which is also present in the non-latching embodiments), latching disc 2375, roller 2335, latching cable 2209, latch spring 2206, latch 2207, latch stop plate 2400, and latch recess area 2410 (actually created by recess within the handle cap, but used in latching action). As mentioned previously, the latch lever(s) (or latching levers) are present on the exterior of the handle body. Latch lever(s) 140, either on one or both sides of the body, can be positioned "off" or "on" by the user either before, during, or after the trigger grip is squeezed (e.g., to grasp an object). In certain embodiments, the latch lever can be locked "on" and/or "off." In other words, the latch lever when locked "on" will allow the latch to function when the trigger is squeezed beyond a certain point. See below. When the latch lever is "off" the latch will not function even when the trigger is squeezed beyond the required distance. See below. In certain embodiments, the locking of the latch occurs by turning or pushing latching lever 140 past a designated point. In some embodiments, the body of the handle comprises a ridge, bump, or other protuberance (optionally comprised of the same material as the handle body) positioned within the motion range of lever 140. Thus, in some embodiments, when the lever is pushed up, it will be forced above the ridge by the action of the user. In such instances, the lever will catch on the ridge which will prevent the lever from moving back downwards. Thus, in such example, the lever will be in an "off" position and therefore the latching mechanism will not be able to be engaged.

At the bottom end of latch 2207 certain embodiments comprise a beveled or sloped edge. Such bevel/slope edge is on the side of the latch facing towards handle cap 155, and allows for the latch to move more easily up and over the handle cap when the trigger is squeezed. Certain elements of the handle cap also comprise a corresponding bevel/slope area 2200 as well.

In various embodiments, the optional latch spring, latch cable, and cable comprise one or more metal (e.g., aluminum, anodized aluminum, steel, stainless steel, magnesium, magnesium alloy(s), iron, or various alloys and/or combinations thereof). In some embodiments, the latch spring, latch cable, and cable comprise stainless steel. In various embodiments, the latch lever, latch, pin (also referred to as latching or latch lever shaft), latch stop plate, and latching disc comprise metal (e.g., aluminum, anodized aluminum, steel, stainless steel, magnesium, magnesium alloy(s), iron, or various alloys and/or combinations thereof), plastic (e.g., a polycarbonate, a polyvinyl, a polyoxymethylene, a thermoplastic, a thermoplastic rubber, a thermoplastic elastomer, etc.), ceramic, polymer, resin, wood, or any combinations thereof. In certain embodiments, the latch lever, latch, pin, latch stop plate, and latching disc comprise a polyoxymethylene, Lexan, and/or Delrin and the latch spring, (and optionally latch cable) comprise stainless steel. In some embodiments, the latch cable and/or the cable comprise nylon. In some embodiments, the latch cable and/or the cable comprises an articulated strap, strap, wire, woven wire, braided wire, chain, or other similar cable-like element Exemplary Operation The devices of the invention are capable of use in a number of ways and for a number of methods. Thus, description of specific uses herein should not necessarily be taken as limiting. In certain embodiments, the device is held, via the handle within a user's hand, with the user's fingers wrapped around trigger 150, and the user's palm against the back of the handle at palm rest 160. Again, as mentioned above, areas where a user holds the device can comprise material to help prevent slippage (a problem of special concern with users who are elderly or who have poor gripping ability) and/or to present a decorative aspect (e.g., a contrasting color and/or texture). Thus, the palm rest at the back of the handle can comprise, e.g., an overmolded layer of rubber, thermoplastic rubber, thermoplastic elastomer, or the like. In some embodiments, the trigger can also comprise, thermoplastic elastomer and/or thermoplastic rubber (e.g., as an overmolded layer on, e.g., polyoxymethylene, Lexan, Delrin, etc.). Some embodiments shown in the figures comprise a stippled appearance in regions that are optionally colored in various devices. See, e.g., FIGS. 22 and 24. Of course, it will be appreciated that different embodiments can comprise different colors/textures/patterns/etc. in different areas of the devices in the different embodiments. Such colors, etc., can add to the aesthetically pleasing shape of the devices. In additional embodiments, the device can further comprise a forearm brace running from the handle back along the user's forearm to help support the device. Such braces are especially useful for users having poor wrist strength. Also as mentioned above, the entire head of the device (i.e., region A in FIG. 1) can be rotated in various embodiments in order to produce the proper angle for grasping. See above.

As explained throughout, the length of the hollow tube/shaft of the device is adjustable. Thus, in use, the user will determine the proper or desired length of the device, unlock or loosen the tube locking mechanism (e.g., tube locking mechanism 137, e.g., by unscrewing it), pull or push the two pieces of the tube/shaft (e.g., tubes 135 and 136) together or away, and refasten the tube locking mechanism. Such adjustment of the two pieces of the tube/shaft also positions the toothed rod (e.g., toothed rod 590) a greater or lesser distance through the TRLM (e.g., TRLM 640).

Once the head is properly angled, the length is properly adjusted, and the device is properly held, the user typically squeezes trigger 150 in order to grasp an object. Squeezing the trigger pushes the linkage lever (e.g., linkage lever 2201/2203) back and down within the handle (optionally tracking along a slope such as slope 2440). The downward movement of the linkage lever pulls a cable (e.g., cable 660) which is attached to the free end of the lower linkage lever, e.g., point 2180, along with it. The cable, in turn, traverses the handle by going over a roller (e.g., roller 2335 or 2105) and pulls on the TRLM (e.g., TRLM 640) by pulling on a lever within the TRLM (e.g., lever 1100). The lever, in turn pivots and compresses a lever spring such as spring 1110. The lever thus engages its one or more teeth with a toothed rod (e.g., toothed rod 590) thereby operably connecting the cable/TRLM with the toothed rod. The toothed rod, in turn, pulls on a jaw actuator rod (e.g., actuator rod 351). The jaw actuator rod pulls on the jaw actuator (e.g., 350) by pulling on the jaw actuator cap (e.g., 370) and thus pulls the proximal ends (e.g., ends 305) of the jaw members (e.g., jaws 120) back into the jaw base assembly while the distal ends of the jaw members and jaw pads, pivot and are pulled towards one another.

When the trigger is released (assuming that the jaws have not been locked through use of the optional latching feature) the trigger no longer pushes the linkage lever down into the handle. Thus, there no longer is a force pulling on the cable so the TRLM lever spring is able to disengage the TRLM lever from the toothed rod. Because the toothed rod is therefore free, the jaw actuator spring is able to push the proximal ends of the jaw members distally which pivots the jaw members back open.

It will be appreciated that a wide range of different sized and/or different shaped objects can be grasped by the device. Small objects can optionally be grasped between the jaw pads on the end of the jaw members while larger objects can be grasped between the pads or in the larger area between the jaw members. As seen in the figures, the jaw members are angled so that they encompass a wide opening between them. In some instances when an object to be grasped is large enough to require the jaw members to be fully opened, the trigger can still be pulled back (e.g., far enough to allow latching in those embodiments comprising a latching mechanism, see below) and pressure applied to grip the object. In such instances, some embodiments of the device can optionally allow trigger movement and applied pressure even without movement of the jaw members (e.g., when the jaws are held to their greatest extension around a large object), e.g., by play amongst the various cable/rod components, and/or by compression of the rod springs and proximal movement of the cable and TRLM, etc.

As will be appreciated, in various embodiments, the jaw members can be moved (e.g., closed) over a greater distance than the distance that the trigger is moved. Such embodiments allow for use of the device to grasp a wider range of objects than would otherwise be possible. In some embodiments, the trigger can be moved, e.g., ~1.5 inches while the tips of the jaw members close, e.g., ~5, ~5.5, or ~6 inches (e.g., the distance between them). In certain embodiments, such ratio between the distance the trigger is squeezed (moved) and the distance the tips of the jaws move can comprise about 1.5:5, 1.5:5.5, 1.5:6, 1.5:6.5, 1:5, 1:5.5, 1:6, 1:6.5, 0.5:5, 0.5:5.5, 0.5:6, 0.5:6.5, etc. In various embodiments, the tips of the jaw members move a greater distance than the distance moved by the trigger.

An optional feature in some embodiments of the device comprises a latching or locking system (a latching mechanism) which allows the jaw members to be fixed in place (e.g., while grasping an object). This feature can be especially important for users who cannot maintain a constant grip pressure, thus allowing them to grasp an object, lock the jaw members, and not have to keep applying constant pressure on the trigger. In some such embodiments, the locking action can engage no matter the placement of the jaw members (e.g., jaws fully opened, jaws partially opened, jaws fully closed, etc.). To engage or disengage the latching mechanism, which can be done before, during, or after grasping of an object, the user moves latching lever 140. As stated previously, in various embodiments, the lever can be present on both sides of the handle body (see FIG. 23) or the lever can be present on only one side of the handle body. To disengage the latch mechanism, in typical embodiments, the latch lever is pushed upwards by the user (e.g., by the user's thumb). Within the range of motion of the latch lever, various embodiments comprise a ridge, bump, or other protuberance on the handle body, which can be part of the handle body. See ridge 190 in FIG. 1. In certain embodiments, the lever is flush or substantially flush with the body of the handle so when it is pushed upwards, it is moved up and over the ridge by force from the user. Additionally, and/or alternatively, the latch lever can comprise a ball bearing or opposing ridge on its side facing the body of the handle, which ball bearing, ridge, or similar protuberance on the latch lever interacts with the ridge or protuberance on the handle body. Once the latching lever is above the ridge it tends to stay there until moved downwards by the user. Movement of the latch lever upwards, rotates the pin that the latching levers are operably attached to (e.g., pin 2103) and the latch disc (e.g., 2375) and optionally the roller (e.g., roller 2335 when present). Such rotation pulls on the latch cable (or strap, etc.) 2209 which pulls latch 2207 upwards. If the latch is pulled upwards, then even when the trigger is squeezed and moves into the body of the handle, the latch will not be able to extend downwards into recess area 2410 in order to latch the jaws.

In uses when the user desires to engage the locking mechanism, latching lever 140 is not pushed upwards (or is pushed downwards below the ridge/protuberance if it the latching lever is above such). Thus, when the trigger is squeezed and moves back into the body of the handle, latch 2207 (which can be sloped/beveled on the bottom) moves up and into the body of the handle over area 2200. When the trigger is squeezed far enough back, the latch is pushed down into recess 2410 by action of latch spring 2206. The latch spring pushes against latch plate 2400 and the top of the latch. When the latch is moved in position above the latch recess, the latch spring (e.g., a compression spring) pushes the latch into the recess where it catches on the interior of the handle cap and thus "locks" the trigger in place. Since the trigger is locked in place, it therefore causes the linkage lever to be locked in place, which in turn causes the cable and toothed strap to be locked in place, which causes the jaw members to be locked in place. To release the lock, users can move the latching lever upwards. See above.

As stated previously, the locking mechanism can be engaged (when it is switched "on") no matter the size of the object being grasped. For example, if a small object is to be grasped between the tips/pads of the jaw members or if a large object is to be grasped between the main bodies of the jaw members so that the jaws are at their widest, the jaws can still be latched. In either instance, the trigger is squeezed until the object is grasped. In some embodiments, the amount of trigger squeezing necessary just to grasp the object can be enough to push the trigger, and hence the latch, back far enough into the handle so that the latch is capable of engaging and locking the trigger (if the latch is "on"). However, the current invention also optionally provides that once an object is grasped (and, thus, the jaws held a certain distance apart), the user can still squeeze the trigger far enough into the handle to engage the latch no matter the size of the object held. This is optionally because of play within the various connected components in various embodiments, or by compression of the rod springs and proximal movement of the cable, etc. Such expansion/stretch, thus, allows the cable and toothed strap, etc., to move proximally and the trigger to be moved far enough into the handle so that the latch is engaged (when it is "on") no matter the size of the object being held.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above may be used in various combinations. All publications, patents, patent applications, or other documents cited in this application are incorporated by reference in their entirety for all purposes to the same extent as if each individual publication, patent, patent application, or other document were individually indicated to be incorporated by reference for all purposes

What is claimed is:

1. An adjustable length pick up device for grasping an object, the device comprising:
   a) a head region comprising two opposing jaw members;
   b) a tube region operably connected to the head region; and,
   c) a handle region operably connected to the tube region, wherein said handle region comprises a trigger;
   wherein the tube region comprises a cable that is operably connected to the trigger, a toothed rod comprising a plurality of teeth with said toothed rod operably connected to the jaw members, and a toothed rod locking mechanism that is operably connected to the cable via a lever;
   wherein the lever comprises one or more teeth which can mate with the teeth of the toothed rod and said lever is operably controlled by the trigger via the cable;
   wherein squeezing the trigger causes the lever to operably engage with the toothed rod and wherein releasing the trigger causes the lever to operably disengage with the toothed rod; and,
   wherein the tube region comprises an adjustable length.

2. The device of claim 1, wherein the tube region comprises a telescoping tube.

3. The device of claim 1, wherein each of said jaw members comprises a proximal end and a distal end, and each of said jaw members is operably attached at a pivot point to a jaw base assembly, thus allowing movement of each of said jaw members around said respective pivot point; wherein the proximal end of both said jaw members operably interacts with a jaw actuator within the jaw base assembly, wherein said jaw actuator is operably connected to an actuator rod and a jaw actuator spring and wherein the actuator rod is operably connected to the toothed rod;
   wherein the handle region comprises a handle body having a base and a linkage lever having a free end wherein the cable is operably coupled to the free end of the linkage lever; and,
   wherein squeezing the trigger causes the linkage lever to extend towards the base of the handle body thus causing the cable to move proximally in the handle body and in the tube region and causing the toothed rod locking mechanism to operably engage with the toothed rod which thereby causes the toothed rod to move proximally in the tube region, thus causing the jaw actuator rod and jaw actuator to move proximally, which in turn, draws in the proximal end of each of said jaw members, thus causing each of said jaw members to move around said respective pivot point and causing the distal ends of the opposing jaw members to move towards one another.

4. The device of claim 3, wherein the jaw members comprise a textured inner surface layer.

5. The device of claim 3, wherein each of said jaw members comprises a pad area at said proximal end.

6. The device of claim 3, wherein the jaw actuator comprises a proximal end and a distal end, and wherein the jaw actuator spring exerts pressure against the proximal end of the jaw actuator which causes the distal ends of the jaw members to pivot away from each other as the jaw actuator is pushed distally.

7. The device of claim 1, wherein a movement of the trigger causes a movement of the jaw members over a greater distance than that moved by the trigger.

8. The device of claim 1, wherein the handle body comprises a palm rest area, wherein said palm rest area comprises a thermoplastic rubber overlay or a thermoplastic elastomer overlay on the handle body.

9. The device of claim 1, wherein the head region can be rotated relative to the tube region, and secured in one or more orientations.

10. An adjustable length pick up device for grasping an object, the device comprising:
    a) a head region comprising two opposing angled jaw members, each of wherein said jaw members comprises a proximal end and a distal end, and each of said jaw members is operably attached at a pivot point to a jaw base assembly, thus allowing movement of each of said jaw members around said respective pivot point; wherein the proximal end of both said jaw members operably interacts with a jaw actuator within the jaw base assembly, wherein said jaw actuator is operably connected to an actuator rod and a jaw actuator spring;
    b) a telescoping tube region comprising an elongated hollow tube enclosing a cable that is operably connected to a trigger, a toothed rod comprising a plurality of teeth, and a toothed rod locking mechanism operably connected to the cable via a lever, wherein said lever comprises one or more teeth that can mate with the teeth of the toothed rod, and wherein said toothed rod, said toothed rod locking mechanism, lever, and cable are operably connected to the actuator rod; and, c) a handle region comprising a handle body having a base, the trigger, and a linkage lever having a free bottom end, wherein the cable is operably coupled to the free bottom of the linkage lever;

wherein squeezing the trigger causes the linkage lever to extend towards the base of the handle body thus causing the cable to move proximally in the handle body and in the tube region and causing the lever in the toothed rod locking mechanism to operably engage with the toothed rod, thereby causing the toothed rod to move proximally in the handle body and in the tube region, the jaw actuator rod and jaw actuator to move proximally, and, draws in the proximal end of each of said jaw members, thus causing each of said jaw members to move around its pivot point and causing the distal ends of the opposing jaw members to move towards one another.

* * * * *